(12) United States Patent
Xu et al.

(10) Patent No.: US 8,240,383 B2
(45) Date of Patent: Aug. 14, 2012

(54) METHODS FOR MAKING AND USING UV/EB CURED PRECURED PARTICLES FOR USE AS PROPPANTS

(75) Inventors: Liang Xu, Houston, TX (US); Avis Lloyd McCrary, Montgomery, TX (US); John W. Green, Cypress, TX (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 302 days.

(21) Appl. No.: 12/437,717

(22) Filed: May 8, 2009

(65) Prior Publication Data

US 2010/0282462 A1 Nov. 11, 2010

(51) Int. Cl.
*E21B 43/04* (2006.01)
*E21B 43/267* (2006.01)
*C09K 8/80* (2006.01)

(52) U.S. Cl. ............... 166/280.2; 166/278; 166/305.1; 166/308.3; 427/220; 427/221; 428/403; 428/407; 507/219; 507/269; 507/924

(58) Field of Classification Search ........... None
See application file for complete search history.

(56) References Cited

U.S. PATENT DOCUMENTS

| | | | |
|---|---|---|---|
| 4,255,554 A | 3/1981 | Wuskell | |
| 4,694,905 A | 9/1987 | Armbruster | |
| 4,785,884 A | 11/1988 | Armbruster | |
| 4,923,714 A | 5/1990 | Gibb et al. | |
| 4,960,826 A | 10/1990 | Walisser | |
| 5,218,038 A | 6/1993 | Johnson et al. | |
| 5,296,854 A | 3/1994 | Hamilton et al. | |
| 5,733,952 A | 3/1998 | Geoffrey | |
| 5,916,966 A | 6/1999 | Walisser | |
| 5,952,440 A | 9/1999 | Walisser et al. | |
| 6,582,819 B2 | 6/2003 | McDaniel et al. | |
| 7,153,575 B2 | 12/2006 | Anderson et al. | |
| 7,919,183 B2 * | 4/2011 | McDaniel et al. | 428/402 |
| 2006/0078682 A1 | 4/2006 | McDaniel et al. | |
| 2006/0124303 A1 | 6/2006 | Nguyen et al. | |
| 2006/0177661 A1 | 8/2006 | Smith et al. | |
| 2008/0230223 A1 | 9/2008 | McCrary et al. | |
| 2009/0238988 A1 * | 9/2009 | McDaniel et al. | 427/487 |
| 2010/0263867 A1 * | 10/2010 | Horton et al. | 166/292 |

FOREIGN PATENT DOCUMENTS

| | | |
|---|---|---|
| JP | H9-324110 | 12/1997 |
| WO | WO2005/097353 | 10/2005 |
| WO | WO2008/088449 | 7/2008 |

OTHER PUBLICATIONS

Dean et al., Micelluler Structure and Mechanical Properties of Block Copolymer-Modified Epoxies, Journal of Polymer Science, Part B: Polymer Physics, 2001, pp. 2996-3010, vol. 39, No. 23, John Wiley and Sons, Inc., New York.

Grubbs et al., Reactive Block Copolymers for Modification of Thermosetting Epoxy, Macromolecules, 2000, pp. 9522-9534, vol. 33, No. 26, American Chemical Society, Web Published.

(Continued)

*Primary Examiner* — George Suchfield

(57) ABSTRACT

Disclosed herein are methods of making free flowing coated particles and low temperature including a step of curing the coating with UV light or electron beam. Each particle has a precured coating disposed upon a substrate. Methods of using the particles are also disclosed.

23 Claims, 3 Drawing Sheets

OTHER PUBLICATIONS

Guo et al., Phase Behavior, Crystallization, and Hierarchial Nanostructures in Self-Organized Thermoset Blends of Epoxy Resin and Amphiphilic Poly EO-block-PO-block-EO Triblock Copolymers. Macromolecules, 2002, pp. 3133-3144, vol. 35, American Chemical Society, Web published.

Hillmyer et al., Self-Assembly and Polymerization of Epoxy Resin-Amphiphilic Block Copolymer Nanocomposites, Journal of the American Chemical Society, 1997, pp. 2749-2750, vol. 119, No. 11, American Chemical Society, Minnesota.

Könczöl et al., Ultimate Properties of Epoxy Resins Modified with a Polysiloxane-Polycaprolactone Block Copolymer, Journal of Applied Polymer Science, 1994, pp. 815-826, vol. 54, John Wiley and Sons, Inc., New York.

Mijovic et al., Dynamics and Morphology in Nanostructured Thermoset Network/Block Copolymer Blends in Network Formation, Macromolecules, 2000, pp. 5235-5244, vol. 33, American Chemical Society, Web published.

* cited by examiner

METHODS FOR MAKING AND USING UV/EB CURED PRECURED PARTICLES FOR USE AS PROPPANTS

FIELD OF THE INVENTION

The disclosure relates to precured coated particles and to methods for making and using the same. In particular, this disclosure relates to coated particles used as proppants in a hydraulic fracturing treatment and made by coating a particle with a resin in the absence of added heat and curing the resin with ultraviolet (UV) light or electron beam (EB) in the absence of added heat prior to injection into a subterranean formation.

BACKGROUND OF THE INVENTION

The term "proppant" is indicative of particulate material which is injected into fractures in subterranean formations surrounding oil wells, gas wells, water wells, and other similar bore holes to provide support to hold (prop) these fractures open and allow gas or liquid to flow through the fracture to the bore hole or from the formation. Proppants are commonly used to prop open fractures formed in subterranean formations such as oil and natural gas wells during hydraulic fracturing.

Uncoated and/or coated particles are often used as proppants to keep open fractures imposed by hydraulic fracturing upon a subterranean formation, e.g., an oil or gas bearing strata.

The uncoated proppants are typically particles of sand or a variety of ceramics, as known in the art. Particles used to prop fractures generally comprise sand or sintered ceramic particles. The advantage of sand is that it is inexpensive. Its disadvantages are its relatively low strength (high crush values) and lower flow capacities than sintered ceramic particles. Sintered ceramic particles are also used as proppants. The ceramic particles are disadvantageous in that the sintering is carried out at high temperatures, resulting in high production costs. In addition, expensive raw materials are used. These two factors combine to make ceramic proppant an expensive alternative. Some versions of the ceramic proppant also have increased apparent densities (as compared to sand) which translates to more difficulty in carrying the proppant out into the fracture and requiring more pounds of proppant to fill the created fracture volume.

The coated proppants have individual particles coated with a resin. The individual particles are typically particles of sand, ceramics, glass beads, walnut shells, etc. as known in the art. The proppant coatings may be precured or curable. The precured proppants include a substrate core and a coating of resin cured prior to insertion into the subterranean formation. The curable proppants include a substrate core and a coating of resin at least partially cured downhole to form a consolidated proppant pack. Resin formulations typically used for curable coatings on proppant substrates (sand, ceramic, etc.) result in a highly crosslinked coating on the surface of the substrates.

Curable resin coated proppants and precured resin coated proppants have been commercially available for use as propping agents. A curable proppant has a resin coating that includes a resin that is usually at least partially, and but not fully, cured. In contrast, a "precured" proppant has a cured resin coating.

The terms "cured" and "curable" are defined for the present specification by three tests historically employed in the art.

Temperature Stick Point Test: placing coated material on a heated melt point bar and determining the lowest temperature at which the coated material adheres to the melt point bar. A "sticking temperature" of greater than 350° F., typically indicates a cured material, depending upon the resin system used.

Acetone Extraction Test: an acetone extraction method, as described below, to dissolve the fraction of resin within the coating that is uncured.

Compressive Strength Test: no bonding, or no consolidation of the coated particles, following wet compression at atmospheric pressure at 200° F. for a period of as much as 24 hours, typically indicates a cured material. However, a precured resin coating does not mean the coating has zero curability left in it. Precured coatings are coatings such that the coated particles do not have the ability to generate significant particle to particle bond strength, thus less than 10 psi bond strength when subjected to moderate conditions of temperature (<200° F.) and atmospheric pressure closure stress. Typically the wet compression test is performed on a 12 pounds per gallon slurry in 2% KCl.

However, unless otherwise indicated, the terms cured and curable are defined by the Compressive Strength Test.

For purposes of this application, the term "cured" and "crosslinked" are used interchangeably for the hardening which occurs in an organic binder. However, the term "cured" also has a broader meaning in that it generally encompasses the hardening of any binder, organic or inorganic, to form a stable material. For example, crosslinking, ionic bonding and/or removal of solvent to form a bonded material in its final hardened form may be considered curing. Thus, mere removal of solvent from an organic binder prior to crosslinking may or may not be curing depending upon whether the dry organic binder is in final hardened form.

Proppants are generally used to increase production of oil and/or gas by providing a conductive channel in the formation. Fracturing of the subterranean formation is conducted to increase oil and/or gas production. Fracturing is caused by the injection of a fluid (either a hydrocarbon, water, foam or emulsion) into a formation at a rate that exceeds the formation's ability to accept the flow. The inability for the formation to dissipate the fluid results in a buildup of pressure. When this pressure buildup exceeds the strength of the formation rock, a fracture is initiated. Continued pumping of the fracturing fluid will result in the fracture growing in length, width and height. The rate required to initiate and extend the fracture is related to the injection rate and viscosity of the fracturing fluid. This combination of injection rate and fluid viscosity is also a critical factor in the ability of the fracturing fluid to transport the proppant to the most distance points of the fracture geometry being created. As the fracture is formed, a particulate material, referred to as a "propping agent" or "proppant" is placed in the formation to maintain the fracture in a propped condition when the injection pressure is released. As the fracture forms, the proppants are carried into the fracture by suspending them in additional fluid or foam to fill the fracture with a slurry of proppant in the fluid or foam. Upon ceasing the injection of fluid, the proppants form a pack that serves to hold open the fractures. The propped fracture thus provides a highly conductive channel in the formation. The degree of stimulation afforded by the hydraulic fracture treatment is largely dependent upon formation parameters, the fracture's permeability, the propped fracture length, propped fracture height and the fracture's propped width.

When the oilfield industry "fractures" hydrocarbon bearing formations, the use of proppants to retain the high surface area created by the fracture has become common practice. It is highly desirable that the proppant particles are of high performance and can be produced in highly efficient processes (are economically attractive) with minimal investment capital and at remote sites (such as existing transloads).

WO 2008/088449 explains there have been several studies related to increasing the fracture resistance or toughness of epoxy resins by adding to the epoxy resin various block copolymers as toughening agent. Much of the work is focused on the use of amphiphilic diblock copolymers having an epoxy miscible block and an epoxy immiscible block. In those studies, the epoxy miscible block is poly(ethylene oxide) ("PEO") and the immiscible block is a saturated polymeric hydrocarbon. For example, Journal of Polymer Science, Part B: Polymer Physics, 2001, 39(23), 2996-3010 discloses that the use of a polyethylene oxide)-b-poly(ethylene-alt-propylene) ("PEO-PEP") diblock copolymer provides micellar structures in cured epoxy systems; and that block copolymers self-assembled into vesicles and spherical micelles can significantly increase the fracture resistance of model bisphenol A epoxies cured with a tetrafunctional aromatic amine curing agent. Journal of The American Chemical Society, 1997, 119(11), 2749-2750 describes epoxy systems with self-assembled microstructures brought about using amphiphilic PEO-PEP and poly(ethylene oxide)-b-poly(ethyl ethylene) ("PEO-PEE") diblock copolymers. These block copolymer containing-systems illustrate characteristics of self-assembly. Although effective at providing templated epoxies with appealing property sets, the known block copolymer materials are too expensive to be used in some applications. Other block copolymers incorporating an epoxy-reactive functionality in one block have been used as modifiers for epoxy resins to achieve nanostructured epoxy thermosets. For example, Macromolecules, 2000, 33(26) 9522-9534 describes the use of poly(epoxyisoprene)-b-polybutadiene ("BIxn") and poly(methylacrylate-co-glycidyl methacrylate)-b-polyisoprene ("MG-I") diblock copolymers that are amphiphilic in nature and are designed in such a way that one of the blocks can react into the epoxy matrix when the resin is cured. Journal of Applied Polymer Science, 1994, 54, 815 describes epoxy systems having submicron scale dispersions of poly(caprolactone)-b-poly(dimethylsiloxane)-b-poly(caprolactone) triblock copolymers. Other self-assembled amphiphilic block copolymers for modifying thermosetting epoxy resins to form nanostructured epoxy thermosets are known. For example, Macromolecules 2000, 33, 5235-5244 and Macromolecules, 2002, 35, 3133-3144, describe the addition of a poly(ethylene oxide)-b-poly(propylene oxide) ("PEO-PPO") diblock and a poly(ethylene oxide)-b-poly(propylene oxide)-b-poly(ethylene oxide) ("PEO-PPO-PEO") triblock to an epoxy cured with methylene dianiline, where the average size of the dispersed phase in the diblock-containing blends is of the order of 10-30 nm. A polyether block copolymer such as a PEO-PPO-PEO triblock is also known to be used with an epoxy resin as disclosed in JP H9-324110. While some of the previously known diblock and triblock copolymers mentioned above are useful for improving the toughness of epoxy resins, none of them were used in proppant applications in hydraulic fracturing.

WO 2008/088449 discloses a coated proppant, having a toughening agent in its coating, which comprises of a proppant particulate substrate and a coating layer on the substrate. The coating layer is formed from a coating composition which comprises a resin, a curing agent, an adhesion promoter, and a toughening agent. In the coating composition, the resin may be an epoxy resin or a phenolic resin or a mixture thereof. In the coating composition, the curing agent may be one or more of a) an aliphatic or modified aliphatic amine, b) aromatic amine, c) a cycloaliphatic or modified cyclophatic amine, d) an anhydride, e) Lewis acid like boron triflouride or f) a hexamethylenetetramanine compound. In the coating composition, the toughening agent may be any one of the commercially available toughening agents. There are a number of commercial toughening agents available such as carboxyl-terminated copolymer of butadiene and acrylonitrile liquid rubber and other functionalize liquid rubbers. Some core-shell rubber can also be added to the epoxy resin as toughening agents. For example, CTBN from Novean and ICANE ACE MX-117 from Kaneka Corporation may be used as toughening agents on proppants. In preferred embodiments, a block amphiphilic block copolymer is used. The amphiphilic block copolymer contains at least one epoxy resin miscible block segment and at least one epoxy resin immiscible block segment. The immiscible block segment may comprise at least one polyether structure provided that the polyether structure of the immiscible block segment contains at least one or more alkylene oxide monomer units having at least four carbon atoms. In one preferred embodiment of the present invention, XU 19110 epoxy resin from The Dow Chemical Company is used. The XU 19110 is a toughened liquid epoxy resin and contains a standard Bisphenol-A epoxy resin blended with a toughening agent. This product is a blend of about 95 wt % standard Bisphenol-A epoxy resins and about 5 wt. % of toughening agent such as amphibilic block copolymer. The EEW value of XU 19110 is between 192-202 measured with ASTM D-1652.

SUMMARY OF THE INVENTION

In its method respects the present invention relates to a method for making precured free flowing coated particles having a particle size range of about 6 mesh to about 200 mesh, consisting essentially of a particulate substrate having a particle size range of about 6 mesh to about 200 mesh, for example substrate selected from the group consisting of sand and a sintered ceramic particle, and a single layer of precured coating disposed upon the substrate, the coating consisting essentially of a continuous phase comprising curable resin in the absence of solid particles in the coating, comprising the steps of mixing at a temperature in the range from about 50° F. to about 150° F. the substrate with liquid coating material selected from at least one curable resin of the group consisting of epoxy, urethane acrylate, epoxy acrylate (also known as vinyl esters), epoxy-modified novolak resins, resole resins, modified resole resins, terpolymers of phenol, furfuryl alcohol (or furfuryl aldehyde) and formaldehyde, furans, e.g., furfural alcohol-formaldehyde, urethanes, melamines, and unsaturated polyesters, to form curable coated particles consisting essentially of the substrate and a single layer of continuous phase resin curable coating on the substrate, curing the resin on the curable coated particles to form precured coated particles, wherein the curing comprises exposing the curable coated particles to ultraviolet light or electron beam; wherein a photoinitiator is added to the resin if the coating is cured with ultraviolet light; wherein the photoinitiator is optionally added to the resin if the coating is cured with electron beam (the photoinitiator may be added to the resin before, after or during applying the resin to the substrate); wherein the substrate is at a temperature of about 50° F. to about 150° F. when initially mixed with the resin, wherein the curing occurs before the resulting precured coated particles are placed into a subterranean formation, and the precured coated particle has a crush strength of less than 15% crush at 10,000 psi, the resin being present in an amount of at most 5% weight percent of the coated particle.

Preferably the curing occurs in the absence of added heat from initiation of the mixing to production of the precured coated particles. Preferably the curing occurs in the absence of exposing the curable particles to microwaves.

It may be helpful to get the substrate or coated substrate to some nominal temperature in the range from 65 to 100° F. to standardize a formula and cycle time. This would eliminate issues around cycle time changes related to ambient conditions such as outside temperature (where substrate is stored) in winter time.

Typically the coating consists essentially of a continuous phase having an absence of solid particles within the coating.

The present invention also relates to free flowing coated particles having a particle size range of about 6 mesh to about 200 mesh (3360-74 µm), made by the above method. For the purposes of this description, the resins are cured by UV light by exposure to UV light at a temperature less than 150° F. (65.5° C.), typically at room temperature without the use of additional heat. Thus, for example, a thermoset cured by exposing the particles at a temperature of 80° C. (176° F.) to UV light is outside the invention. In place of UV light, electron beam (EB) or light from light emitting diodes (LEDs) may be employed.

The coating is placed directly on the substrate. The term particulate substrate is employed to refer to a substrate provided in the amount of a single particle of substrate per particle of proppant. Thus, the particulate substrate for a particle of proppant consists of a single inorganic particle. Typically the particulate substrate is a sand particle. However, a ceramic particulate substrate can be employed for operating at extreme pressure conditions. A preferred inorganic substrate is 20/40 sand.

The resin coating typically is between 0.5 to 5% of the total weight of the particle. In one embodiment, the coating is placed on a sand or ceramic particle substrate, wherein the substrate is present in an amount of about 95 to 99.5 wt %, based on the total weight of the coated particles. Unless otherwise stated, all percentages disclosed in this specification are weight percents. Typically, the proppant particle has a sphericity of at least about 0.7.

The present invention also relates to a proppant particle comprising proppant particles consisting of a particulate substrate having a single coating of precured resin.

The precured proppant is produced prior to injection into a subterranean formation. For example, the proppant having a precured coating may be stored for at least 1 hour after coating before being placed into the subterranean formation. Producing the coated particles by this process is within the scope of this invention whether precoated onto the proppant at the sand coating plant or various remote locations, such as a part of a transload/inventory warehouse. The process is also a quick and economical way to expand production capacity and with low capital costs.

Typically after producing the precured proppant particles they are stored for at least 24 hours. e.g., 1 to 14 days, at ambient conditions prior to injection into a subterranean formation.

If desired the coating formulations of the present invention, especially the epoxy coating formulations, lack silicone and/or silane. There are typically only three or four components in the coating: the resin (epoxy preferred), the photoinitiator (free radical and cationic photoinitiators preferred), impact modifier/extender (diols/polyols preferred) and optional epoxy silane. Typically the polyols, for example diols, act as chain extenders to make the epoxy backbone of the epoxy resin more flexible. Also, preferably the precured proppant consists of inorganic substrate and a single layer of resin coating. Typically the coatings lack toughening agents such as the block copolymers of WO 2008/0088449 A2 to Turakhia et al. incorporated herein by reference.

The present invention is advantageous because the method results in a precured coated particle. Also, the present method can be performed in remote locations in a low cost plant. Freight savings may also exist by minimizing the costs associated with transporting substrates. Also, this no heating process achieves energy savings over comparable processes which heat phenol-formaldehyde resins to melt the coating onto the substrate or which apply heat to dry or cure the resin coating. Also, by avoiding heating the present method minimizes emissions of volatiles which must be dealt with in a process which heats phenol-formaldehyde resins to melt the coating onto the substrate or which apply heat to dry or cure the resin coating.

The present invention also relates to a method of forming a proppant pack comprising suspending the above-described free flowing precured particles in a carrier fluid to form a suspension and injecting the suspension into a subterranean formation.

In the present application all percentage measurements, unless otherwise indicated, are by weight.

BRIEF DESCRIPTION OF THE FIGURES

The following is a brief description of figures wherein like numbering indicates like elements.

DETAILED DESCRIPTION OF THE PREFERRED EMBODIMENTS

As used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

The present proppant comprises a particle substrate having a coating of UV cured resin in which the curing process is started and advanced without the addition of a substantial amount of heat before the proppant is been placed in the fracture. It may be desirable to preheat all the substrate to a minimal temperature (in the range of about 65 to 100° F. or 70 to 80° F.) to facilitate coating and to get a consistent/reproducible level of cure in the process.

Typically for proppant, individual particles of the particulate substrate have a particle size in the range of USA Standard Testing screen numbers from about 6 to 200 mesh, e.g., 20 to 40 mesh. Typically for proppant or gravel pack individual particles of the particulate substrate have a particle size in the range of USA Standard Testing screen numbers from about 8 to about 100 mesh (i.e. screen openings of about 0.0937 inch to about 0.0059 inch), 20 to 80 mesh, or preferably 40 to 70 mesh. Typical individual particles of the particulate substrate have a diameter of about 0.01 to about 0.04 inches.

Figure 1:
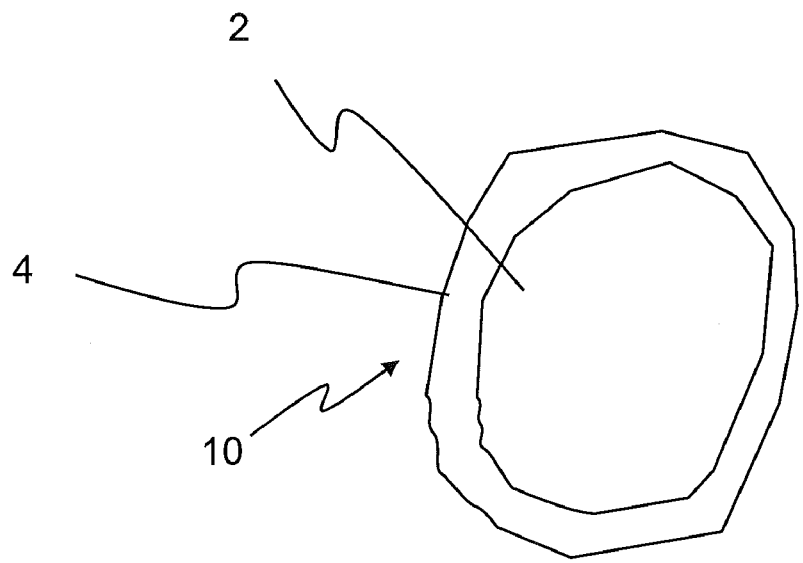
FIG. 1 depicts an embodiment of a coated particle comprising a solid inorganic substrate upon which is disposed a single layer resin coating.

For example, the substrate 2 of FIG. 1 can have average particle sizes of about 100 micrometers to about 1,400 micrometers (about 140 mesh to about 14 mesh) or about 300 micrometers to about 600 micrometers (about 50 mesh to about 30 mesh). A preferred substrate 2 is 20/40 mesh sand.

The organic coating disposed upon the substrate is cured (known in the art as "precured") prior to its use as a proppant. It is cured to the extent it is incapable of generating significant particle to particle bond strength. In particular, proppant with a precured coating has less than 10 psi bond strength (unconfined compressive strength), following being subjected to 200° F. and atmospheric pressure in a wet compression test. Typically the wet compression test is performed on a 12 pounds per gallon slurry in 2% KCl.

FIG. 1 shows an exemplary embodiment of the coated particle 10 comprises a particulate substrate 2 upon which is disposed an organic coating 4. The particulate substrate 2 consists of a single inorganic particle per particle of proppant. The organic coating 4 consists of a single continuous phase layer.

Single Particle Substrate

As shown, for example, in FIG. 1, the substrate is a single particle. The substrate can be any organic or inorganic particulate solid material normally used as propping agents. For example, suitable particulate material, i.e., includes sand, naturally occurring mineral fibers, such as zircon and mullite, ceramic, such as sintered bauxite, or sintered alumina, other non-ceramic refractories such as milled or glass beads, or walnut shells. The substrates can have any desired shape such as spherical, egg shaped, cubical, polygonal, or the like. It is generally desirable for the substrates to be spherical in shape. Substrates can be porous or non-porous. The substrates do not melt at a temperature below 200° F. or 225° F.; typically the substrates do not melt at a temperature below 450° F. or 550° F. The substrate particles are hard and resist deforming or can be deformable. Deforming is different from crushing wherein the particle deteriorates usually creating fines that can damage fracture conductivity. Optionally the single particle substrate may have an at least partially cured resin coating.

This precured coating is primarily utilized with sand substrates or ceramic substrates. On sand substrate, the precured coating enhances particle strength (resistance to crushing). A precured coating on ceramic could either be used to improve the strength or chemical resistance (to acid) of the substrate.

Suitable examples of materials that are modified and used in the substrate are exfoliated clays (e.g., expanded vermiculite), exfoliated graphite, blown glass or silica, hollow glass spheres, foamed glass spheres, cenospheres, foamed slag, sintered bauxite, sintered alumina, or the like, or a combination comprising one of the foregoing materials. Exemplary inorganic substrates may be derived from silica sand, milled glass beads, sintered bauxite, sintered alumina, mineral fibers such as zircon and mullite, or the like, or a combination comprising one of the inorganic substrates. Hollow glass spheres can be commercially obtained from Diversified Proppants.

Cured Single Layer Resins

The proppant has at most one precured coating layer consisting of a continuous phase. The continuous phase comprising a cured polymer and optionally a coupling agent and a toughening agent.

Synthetically produced organic coatings can comprise thermoplastic polymers, thermosetting polymers, or a combination comprising a thermosetting polymer and a thermoplastic polymer. Examples of suitable organic materials that can be used as the coating are polymer precursors (e.g., low molecular weight species such as monomers, dimers, trimers, or the like), oligomers, polymers, copolymers such as block copolymers, star block copolymers, terpolymers, random copolymers, alternating copolymers, graft copolymers, or the like; dendrimers, ionomers, or the like, or a combination comprising at least one of the foregoing.

Examples of suitable resins include the following at least one member of the following: epoxy resin, urethane acrylate oligomer, epoxy (meth)acrylate oligomer, epoxy-modified novolak resins, resole resins, modified resole resins, terpolymers of phenol, furfuryl alcohol (or furfuryl aldehyde) and formaldehyde, furans, e.g., furfural alcohol-formaldehyde, urethanes, melamines, unsaturated polyesters; blends or copolymers thereof. Blends and copolymers of UV/EB curable epoxy resin with one or more of resole resins, terpolymers of phenol, furfuryl alcohol (or furfuryl aldehyde) and formaldehyde, furans, e.g., furfural alcohol-formaldehyde, and furans, e.g., furfural alcohol-formaldehyde, are also suitable as coating resins according to the present invention.

Examples of suitable thermoplastic polymers that can be used in the coating are thermoplastics capable of reacting when using UV/EB radiation, such epoxidized thermoplastics like epoxidized polyisoprene or epoxidized novolacs or thermoplastics with double or triple bonds (polyalkenes or polyalkynes).

1. Epoxy Resins a. Epoxy Resin Chemistry

Epoxy resins are commercially available and prepared from either glycidyl materials such as the ethers, produced by the reaction of chlorohydrin with a phenol or alcohol, or epoxies, such as the product from the reaction of peracetic acid with a linear or cycloaliphatic olefin. The epoxy resin molecule is characterized by the reactive epoxy or ethoxline groups of Formula I:

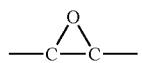

I which serve as terminal linear polymerization points. Crosslinking or curing is accomplished through these groups or through hydroxyls or other groups present. The well-known epoxy resins are usually prepared by the base-catalyzed reaction between an epoxide, such as epichlorohydrin and a polyhydroxy compound, such as bisphenol A. Suitable cationic curable epoxides include monocycloaliphatic epoxides and biscycloaliphatic epoxides.

Preferably epoxy resins can be selected from glycidyl ethers made from bisphenol A and epichlorohydrin. These resins are available in liquid form having a typical viscosity of about 200 to about 20,000 centipoises, and an epoxide equivalent weight of about 170 to about 500 and weight average molecular weight of about 350 to about 4000. Typical epoxy resins include ARALDITE 6005 sold by Huntsman Corporation or EPN 1139 novolac-based epoxy resin such as a liquid epoxy novolac resin manufactured by Ciba-Geigy Corporation or Dow DER 331 epoxy resin is manufactured by Dow Chemical Company, Midland, Mich. However, solid epoxy resins (solid in the neat state) may be employed if they are soluble in the coating resin system and reactive. Preferred epoxy products are available from Hexion Specialty Chemicals Inc., for example EPON 828 epoxy resin.

In general, preferred bisphenol A-based epoxy resin for the present invention would have approximately the structure given in Formula V below. These types of resins are commercially available in a range of molecular weights, epoxy equivalents, and viscosities. Typically, these epoxy resins are reaction products of bisphenol A and epichlorohydrin as shown, for example, by Formula II:

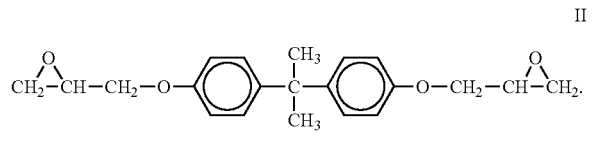

II

The reaction products polymerize to form resins having the following general Formula III:

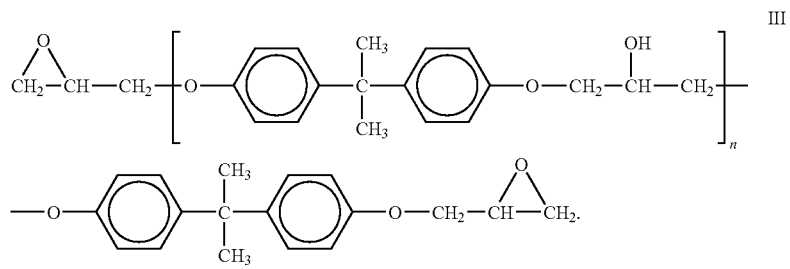

III

In Formula III, n is the number of repeating units and may be from 0 to about 15. Although the preferred formulation employs the above type of epoxy, other epoxy resins are useful. These would include any epoxy resins that are at least di-functional and soluble in the resin system. The upper limit of functionality occurs where the epoxy is insoluble, or intractable, in the resin system. The resin system would include the base resin and the solvents and plasticizers the base resin is dissolved into. The two parameters, functionality and solubility, are key to the application for improved resistance to water-based coatings. If an epoxy resin is soluble in the resin system, and if it is "cross-linkable" (minimally di-functional), then the properties disclosed relative to resistance to water-based coatings would be attainable in varying degrees.

The epoxy resin is uncured when added to the coating resin systems of the present invention. The epoxy resin is then cured. Epoxy resins may be cross-linked by exposure to UV light, electron beams or LED light. Most commercially available LED emits wavelength above 300 nm. It can be also considered as UV (UVA).

In general, a process for making the precured UV coated particles of the present invention with this resin is described below.

Preferred epoxies of the present invention include bisphenol A based aromatic epoxies such as DGEBPA (di-glycidyl ether of bis-phenol-A, e.g. EPON 828 available from Hexion Specialty Chemicals, Inc.), cycloaliphatic epoxies (e.g. EPONEX 1510 available from Hexion Specialty Chemicals, Inc.) and bisphenol F based epoxy (e.g. EPON 862 available from Hexion Specialty Chemicals, Inc.).

For example, cycloaliphatic epoxies which have a tendency to crosslink with polyols, (including phenolic resoles or novolacs) are useful. Formula IV shows a diglycidyl ether of bisphenol A; Formula V shows a diglycidyl ether of bisphenol F; and Formula VI shows a cycloaliphatic diepoxide usable in the present invention.

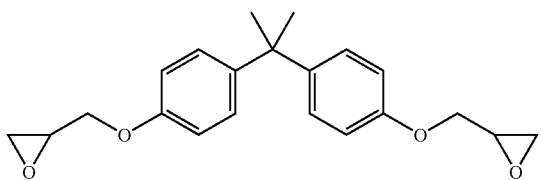

IV

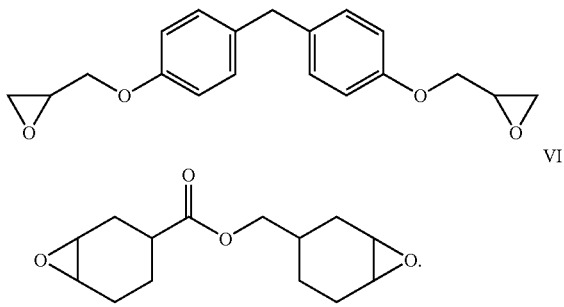

-continued
V

VI

There are typically only three or four components in the coating: the resin (epoxy preferred), the photoinitiator (free radical and cationic photoinitiators preferred), impact modifier (diols preferred) and optional epoxy silane. Typically the coating formulations of the present invention, especially the epoxy coating formulations, have an absence of the block polymer toughening agents of WO 2008/088449 and an absence of silicone. For example, a preferred coating ingredients is a mixture of diglycidal ether bis-phenol A (DGEBPA) epoxy resin, triarylsulfonium salt photoinitiator, and 1,4-butane diol impact modifier in the absence of silicone.

Epoxy resins such as epoxy acrylates may also be suitable resins. Examples of epoxy acrylates include, but are not limited to EBERCRYL 600 (diacrylate ester of bisphenol A epoxy resin available from Cytec Surface Specialties) or EBERCRYL 1608 (diacrylate ester of bisphenol A epoxy resin diluted with 20% of oligotriacrylate (OTA 480) available from Cytec Surface Specialties), CN104 or CN109 (Sartomer), GENOMER 2254 (Rahn).

b. Methods For Making UV Cured Precured Epoxy Coated Particles

To make a precured proppant coated with UV/EB/LED set epoxy resin, or other UV/EB set resin, the particulate substrate, wet resin, and additives are mixed at conditions to provide a curable coating composition.

Figure 2:
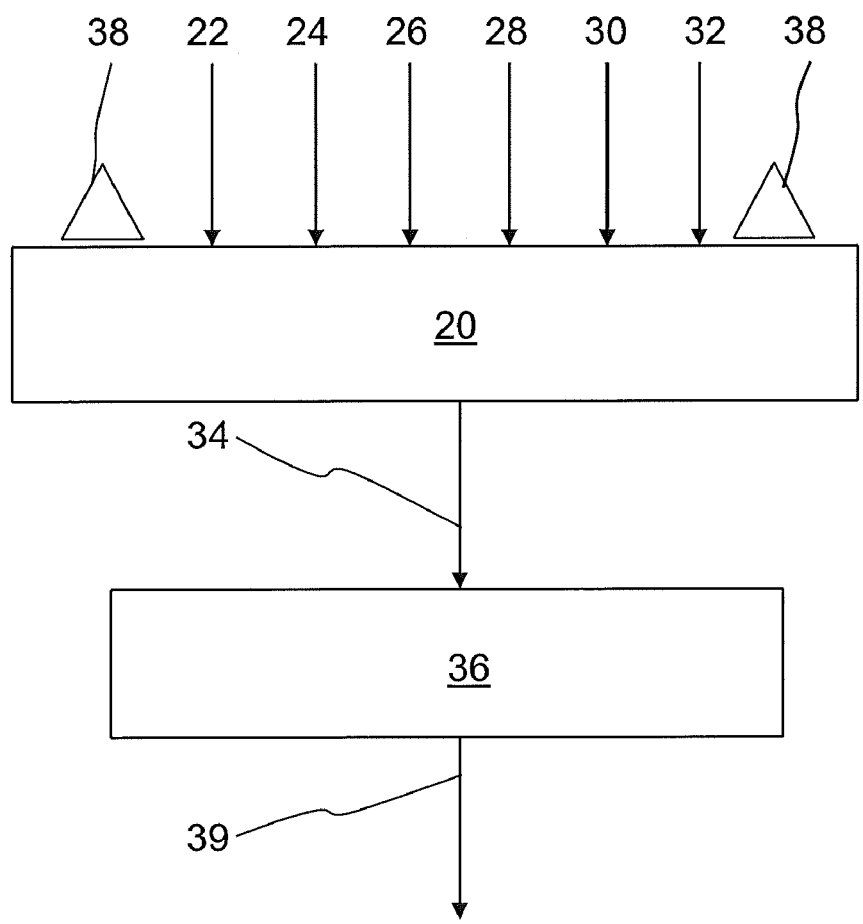
FIG. 2 shows the position of the UV/EB source relative to the other parts of the process in a batch process.

The substrate is initially at a temperature less than 150° F. (65.5° C.). FIG. 2 shows a first embodiment of a batch process for making the present precured proppant. The substrate 22, along with the desired coating polymer or coating polymer precursor 24, are first taken in a mixing device 20 (coating device) and mixed to form a suitable first mixture at a temperature from about 50° F. (10° C.) to about 150° F. (66° C.), preferably about 70° F. (21° C.) to about 120° F. (49° C.).

Although shown separately, typically if a photoinitiator 32 and photo sensitizer are employed they are fed together as a single stream with the coating resin to the mixer 20

Optionally the substrate or coated substrate is heated to some nominal temperature such as 65 to 100° F. to standardize of a formula and cycle time. This would eliminate issues around cycle time changes related to ambient conditions such as outside temperature (where substrate is stored) in winter time.

The mixing can take place in a device 20 that uses shear force, extensional force, compressive force, ultrasonic energy, electromagnetic energy, thermal energy or a combination comprising at least one of the foregoing forces and energies. The mixing is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, screen packs, rolls, rams, helical rotors, or a combination comprising at least one of the foregoing. Exemplary mixing devices are EIRICH mixer, WARING blenders, HENSCHEL mixers, BARBER GREEN batch mixers, ribbon blenders, or the like.

If a profiled rotating drum is employed as the mixer for coating, this rotating drum apparatus typically has a rotation speed of 16-20 rotations/min. Typically, the resin stream is preheated to 50-60° C. and sprayed into the rotating drum apparatus (containing the formed particles) through a nozzle with air atomizing. This rotating drum apparatus operates as a batch process with a process time of about 5 to 20 minutes.

If an Eirich mixer is employed as the mixer for coating, it typically operates at a vessel rotation speed of 20-40, typically 30-35, revolutions per minute (rpm), with a process time of 2-10 minutes, preferably 2-5 minutes. However, if desired the Erich standard foundry mixer may operate at 20 to 80, e.g., 50 to 80 rpm.

If desired a silane (coupling agent) 26 is added to the sand in the mixer 24 and, about 10 to 20, e.g. 15, seconds after the silane, then the liquid resin 24 is added. In the alternative, the silane could be premixed into the resin. In a particularly useful example, for the coated particles produced at laboratory conditions (23° C. with a Hobart mixer), silane is added to the substrate and mixed for 15 seconds; followed by the addition of liquid coating resin while mixing continues for an additional 300 seconds before the dry, free flowing particles are finished.

Optionally a lubricant 30 is added to the mix at some point before the product "breaks down" into free flowing particles. The lubricant is preferably liquid at the mixing temperature and has a sufficiently high boiling point so it is not lost during the mixing process. The amount of lubricant can vary from about 0.01 or 0.03% to about 0.5% by weight based upon the weight of the particulate material.

After sufficient mixing in the mixing device 20 to form particles of curable coated substrate then the free flowing particles of curable coated substrate are exposed to sufficient UV light/EB in the mixing device to cure the coating in the absence of added heat to form particles of precured coated substrate. The cured coated particles are discharged from the mixer 20 and pass through a screen 34 and the desired particle sizes of proppant 39 are recovered. The particles are agitated during curing.

The coated particles 34 are cured in the radiation curing apparatus 36 by exposure to radiation generated by a radiation source 38 and discharged as precured coated proppant stream 39. The mixing device is designed to keep the particles in agitation during curing. The curing process must occur while the particles are moving/separated or the mixture will not remain free flowing.

Radiation curing polymerizes and cures coatings using radiant energy. If curing by ultraviolet or electron beam radiation, cure of the coating composition is achieved by exposure of the coated substrate at a desired dosage for a desired period of time. The sources of radiant energy can vary. For purposes herein, the source is provided by an electron beam or ultraviolet (UV) light. Electron beams typically include higher energy than UV radiation, and their generated electrons have sufficient energy to initiate polymerization and crosslinking of the monomers and/or oligomers. Unlike UV curing, electron beam curing does not require the use of a photoinitiator, but a photoinitiator may still be used. In contrast, UV curing requires the use of a photoinitiator to produce the polymerization reaction of monomers and/or oligomers to form a crosslinked polymer. Also, concerning use of electron beam radiation, this radiation facilitates curing of the radiation curable composition on three-dimensional (3D) objects or surfaces.

The source of radiation typically is a light source, such as from a lamp. For electron beam radiation, four types of lamps that may be used as light sources include high voltage, low voltage, scanning, and sealed beam.

The UV radiation source is typically a conventional low/medium/high pressure mercury vapor lamp or spectrally enhanced lamps with additives such as metal halide. For example, metal halide lamps are mercury vapor lamps with metal halide additives which create specific wavelengths of ultraviolet radiation to precision-match the photo-initiator being cured. The addition of metal halides creates a shift in the spectral output of a standard lamp, producing longer wavelengths. These longer wavelengths enable a greater depth of cure to be achieved, making them particularly useful in the curing of pigmented and thicker coatings. Typical mercury vapor lamps are 125 and 400 watt. The UV irradiance is 100-300 watts/inch. In one embodiment, the dosage of the ultraviolet radiation, also referred to as energy density, is about 300 mJ/cm$^2$ to about 20000 mJ/cm$^2$. In another embodiment, the dosage of the UV radiation is about 800 mJ/cm$^2$ to about 3500 mJ/cm$^2$. The UV light includes a wavelength in the spectral range of between about 200 nm to about 450 nm. More typically, the UV light has a wavelength in the range of 200-400 nm (nanometers), most typically 250 to 400 nm. Ultraviolet light can be also generated by black light fluorescent tubes and some light-emitting diodes. UV lasers may also be employed.

If desired the UV light source 36 is replaced by an electron beam source or LED light source. The coating being cured would contain the appropriate EB (electron beam) activated photoinitiator. In some instances the EB can cure the coating in the absence of an initiator.

In one embodiment, the dosage of the electron beam radiation is about 1 Megarad to about 40 Megarad. In another embodiment, the dosage of the electron beam radiation is about 3 Megarad to about 36 Megarad. Typically the curing occurs in an inert atmosphere an inert atmosphere. The exposure to radiation could be on an endless belt. In the alternative (not shown) the exposure to radiation could be by exposing the particles to the radiation in the mixer 20.

The device shown by Patent Cooperation Treaty published patent application no. WO 2005/097353 to Ming-Wan et al. incorporated herein by reference in its entirety is an example of a device which could be adapted for coating the present inorganic substrate to form coated particles and curing the coating on the present coated particles. WO '353 discloses referring to its FIG. 1 a system 2 including a coater such as but not limited to a fluidized bed coater 10, product vessel 12, wurster tube 14, window 16, nozzle 18 and UV light source 20. A variety of coaters may be employed for fluidization including but not limited to batch operating coaters such as a Glatt Mini fluidized bed with liquid spray (top or bottom) nozzle; rotating fluidized bed; magnetic assist impact coater; drum coater with or without mixing baffles and deflectors; and continuous coaters such as free fall coaters with or without the use of deflectors and spin coaters. Typically, any coater employed is modified for UV light delivery by providing a quartz glass window.

Figure 3:
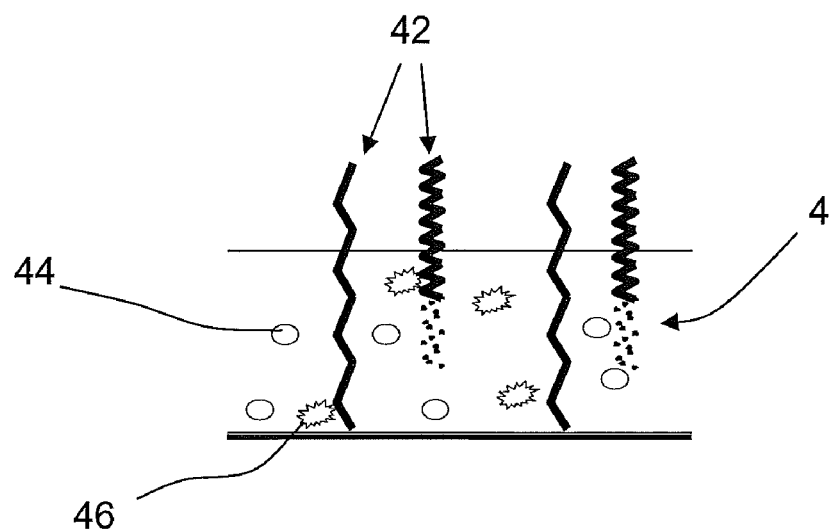
FIG. 3 shows the relative position of the photo-initiator relative to the continuous layer.

FIG. 3 shows the relative positions of the UV light rays 42 of various wavelengths generated by the UV light source 38 (FIG. 2), the photoinitiator 44 and photoinitiator 46 excited by the UV light relative to the continuous layer 4.

Optionally other additives (not shown) may be added to the mixture in the mixer 20. Optionally, the uncoated substrate stream is fed to a refining apparatus (not shown) prior to curing in the UV curing apparatus 38.

No heat is added during these mixing, coating and curing steps, with the proviso that optionally the substrate or coated substrate is heated to some nominal temperature, for example, in the range of 65 to 100° F. to standardize of a formula and cycle time. This would eliminate issues around cycle time changes related to ambient conditions such as outside temperature (where substrate is stored) in winter time.

There is a potential for IR from the UV lamp to add heat, particularly if the UV lamp is not IR filtered. However, this is typically less than 50 degrees F.

The precured coated particle stream is typically sent to classification to collect precured coated substrate having the desired particle size. A typical sieving apparatus is a vibration sieve. Sieved particles of predetermined mesh size range are discharged as a sieved stream. A typical precured coated particle desired size range is 20 to 40 mesh. Over sized and undersized particles are screened off and considered waste.

In an embodiment of a production process, sand is coated in a continuous system. Sand enters an elongate (e.g., 20 foot long) horizontal mixer containing two horizontally mounted shafts having paddles to promote mixing the ingredients and moving them horizontally along the mixer. If employed the optional silane is immediately added and then the resin mixture (containing the epoxy, impact modifier/extender and photoinitiator) are added. This mixture travels down the mixer which is equipped with a bank of UV lights where the initiator is converted to an acid and starts the curing process. The total time in the mixer can range from about 3-10 minutes depending on desired throughput rate. Although in this embodiment the initiator is converted to an acid it can convert to another class of chemical. For example, it can fragment into a free radical or cationic species to cure the resin, for example, to cure unsaturated polyesters or vinyl esters.

Figure 4:
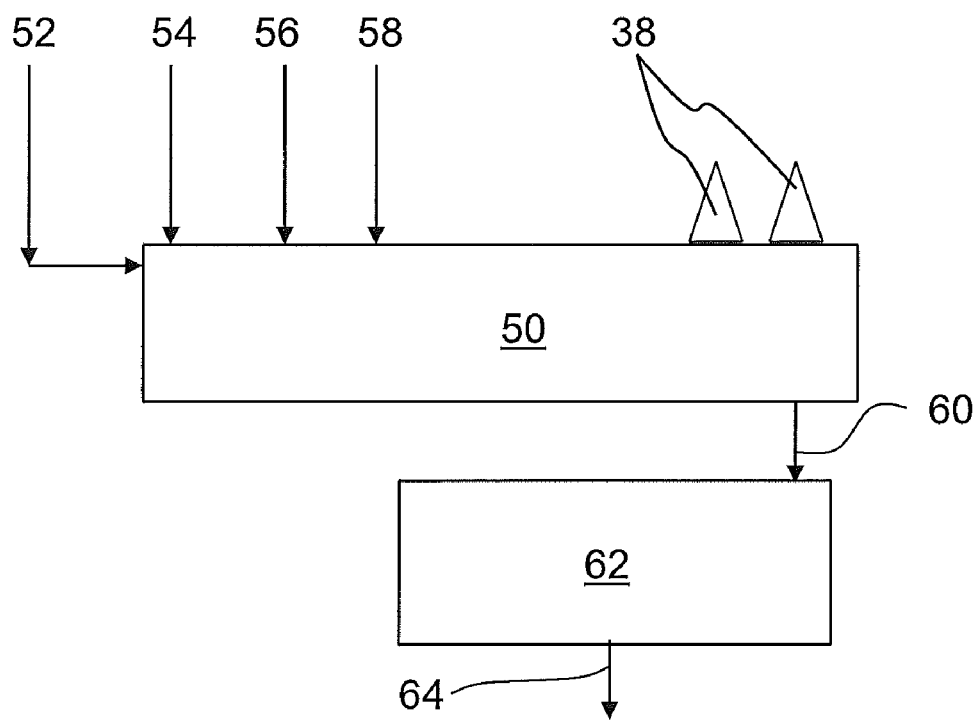
FIG. 4 shows an embodiment of a continuous coating system.

FIG. 4 shows an embodiment of a continuous coating system in which inorganic substrate 52 and resin 54 are fed to the long horizontal oriented mixer 50 that can be of varying length and diameter. The embodiment of the continuous coating system has two horizontal shafts that run the length of the mixer. Along the shaft there are positioned a multiple sets of mixing paddles mounted on the shaft. The paddles are oriented so as to insure both mixing and the transport of the substrate from the beginning of the mixer to its exit point 60. At various points along the mixer are positioned addition ports 56, 58 (two shown) so chemicals can be added at prescribed rates and times. For example, there may be addition ports for:

1. silane coupling agent (although this could be premixed with the resin)
2. photo-initiator (although this may also be premixed with the resin)
3. A processing aid (optional) to reduce agglomeration of the coated substrate particles
4. A water wetting surfactant (also optional)
5. An optional modifier (optionally premixed with the resin or to san simultaneously with resin or added to resin coated sand).

In our configuration the bank of UV lights 38 will be positioned after port 58 but before the coated particles product 60 is discharged onto the screen 62. By using this design the coating will be essentially cured by the time it goes through the screening process and therefore no additional time or agitation is required and the production product can go directly into storage (after leaving the screening equipment). Thus, when the coated particles 60 exit the mixer 50 they go onto a screen deck 62 where agglomerated particles (clusters) are removed from the precured proppant. The resulting precured coated proppant may be transferred to a silo or railcar for storage or transportation.

The batch or continuous process may include a step that applies minimum heat to the sand/substrate prior to coating to get it to a standard condition (say 65-100° F. or 75-80° F.). This is preferred so the cure attained in the process will be consistent regardless of outside conditions that may otherwise affect the temperature of the sand/substrate to be coated.

2. The Urethane Acrylate Oligomer

Preferably, the urethane acrylate oligomers are based on an aliphatic polyether polyol, which is reacted with an aliphatic polyisocyanate and then acrylated. They comprise from about 30 percent to about 80 percent by weight of the base resin. Examples of suitable urethane acrylate and epoxy oligomers include but are not limited to PURELAST 586 and 590 series from Polymer Systems Corporation; PHOTOMER 6008 and 6019, both from Cognis Corporation (Ambler, Pa.); EBECRYL 264, 270, 4842, all from UCB Chemicals, Radcure Division (Smyrna, Ga.); CN 120, 934, 983, 990 all from Sartomer Corporation (Exton, Pa.); and UVE 150 from Croda Resins Ltd. (Belvedere, Kent, England).

PURELAST® aliphatic urethane acrylate oligomers based on polyether backbones, available from Polymer Systems Corporation, Orlando, Fla. Suitable PURELAST® oligomers include 534, 536, and 538 (tri-functional polyether urethane acrylates), and 544, 546 and 548 (tetra-functional polyether urethane acrylates). Additional oligomers include 566, 566A, 569, 569A, 586, 586A, 590, 590A, 595, 595A, 597, 597A, 598 and 598A. These oligomers increase in modulus with increasing number in the series and are either difunctional (no suffix) or monofunctional ("A" suffix). All of these oligomers are sold neat, except for 597A and 598A, which include 7% and 10% isobornyl acrylate, respectively. Particularly preferred from this group are PURELAST® 590 and 595. Methacrylate analogs of these oligomers are suitable as well. PHOTOMER® 6008 from Henkel Corporation, Ambler, Pa., which comprises aliphatic urethane acrylate oligomer from polyether polyol, dicyclohexyl methane diisocyanate, and hydroxyethyl acrylate. The oligomer has a number average molecular weight of about 1,500 daltons and is sold as a solution of the oligomer in tripropylene glycol diacrylate as diluent. PHOTOMER® 6019, also from Henkel Corporation, completely analogous to the above but based on isopherone diisocyanate rather than dicyclohexyl methane diisocyanate. From Specialchem4coatings, EBECRYL 264 from Cytec is an aliphatic urethane triacrylate diluted with HDODA.) EBECRYL 270, from UCB Chemicals, Smyrna, Ga., which comprises an aliphatic urethane diacrylate based on a polyether polyol. UVE 150 from Croda Resins Ltd. (Belvedere, Kent, England).

EBECRYl 4842 is an aliphatic siliconized urethane diacrylate. Sartomer's CN120 is a difunctional bisphenol A based epoxy acrylate. It provides a good balance of water properties and high reactivity. CN120 offers the lowest viscosity of Sartomers bisphenol A based epoxy acrylates. (CN-934 is an aliphatic urethane acrylate.) From Specialchem4 coatings, CN-990 is an aliphatic urethane acrylate oligomer containing bound silicone, improved slip properties; characterized by low odor, good clarity, flexibility, and reduced coefficient of friction. CN-983 is an aliphatic polyester based urethane diacrylate oligomer. CN UVE 150/80 is an epoxy acrylate oligomer blended with 20% tripropylene glycol diacrylate monomer diluent. CN UVE 150/80 is very flexible, exhibits low film shrinkage, and imparts excellent adhesion in UV/EB curable coatings, inks and adhesives.

In general, a process for making the precured UV coated particles of the present invention with this resin would be similar to the continuous or batch processes described above in this specification for making precured UV epoxy resin coated particles.

3. Epoxy (Meth)Acrylate Oligomer (Vinyl Esters)

Vinyl esters are produced by reacting epoxy resins with ethylenically unsaturated carboxylic acids. Bisphenol A epoxy resins, epoxy novolac resins or brominated analogues can be used for epoxy resins. Common acids used to esterify the epoxy resins are acrylic acid and methacrylic acid, but crotonic acid, cinnamic acid and other unsaturated acids can also be used. The resulting epoxy acrylates or epoxy methacrylates (collectively termed epoxy (meth)acrylates) can be cured in free radical reactions alone (homopolymerization) or used with unsaturated monomers (copolymerization), such as styrene and other monomers as mentioned above for unsaturated polyester resins. Vinyl esters can be cured by the methods described above for unsaturated polyesters. Examples of commercially available vinyl esters include DERAKANE supplied by Ashland, HYDROPEL resins provided by AOC.

The epoxy acrylate oligomers are also known as vinyl esters. They can be cured by adding UV initiator to the polymer and then subjecting the polymer to UV light.

Vinyl ester is a resin produced by the esterification of an epoxy resin with an unsaturated monocarboxylic acid. The reaction product is then dissolved in a reactive solvent, such as styrene, to a 35-45 percent content by weight. It can be used as an alternative to polyester and epoxy materials in matrix or composite materials, where its characteristics, strengths, and bulk cost intermediate between polyester and epoxy. Vinyl ester has lower resin viscosity (approx 200 cps), than polyester (approx 500 cps) and epoxy (approx 900 cps).

Vinyl ester resins are stronger than polyester resins and cheaper than epoxy resins. Vinyl ester resins utilize a polyester resin type of cross-linking molecules in the bonding process. Vinyl ester is a hybrid form of polyester resin which has been toughened with epoxy molecules within the main molecular structure. Vinyl ester resins offer better resistance to moisture absorption than polyester resins. EPON 828 epoxy resin is typically used as the epoxy resin to be reacted with ethylenically unsaturated carboxylic acids to form the vinyl esters. EPON 828 epoxy resin has a viscosity of 11,000 to 15,000 cps at 25° C.

By themselves, typical acrylated urethanes and epoxy acrylate oligomers are too viscous for matrix materials. For example, EPON 828 epoxy resin has a greater viscosity than resole 262E (400-600 cps at 25° C.). As a result, there is a need to preheat the resin to 50° C. Thus, to avoid or minimize the preheating, it is desirable to add reactive diluents to reduce the viscosity and help form a continuous resin film on the substrate.

These reactive diluent monomers, which constitute from about 5 percent to about 45 percent by weight of the base resin (based on the total weight of the base resin ingredients), serve to dilute the matrix formulation. They have about 1 to about 5 functional groups, preferably about 1 to about 5 acrylate, methacrylate, vinyl ether or vinyl functional groups. However, all suitable monomers that react with the urethanes or epoxy oligomers and that have about 1 to about 5 functional groups may be used.

Monomers are suitable when they do not introduce volatile or extractable materials into the formulation and do not negatively affect other physical properties such as modulus, tensile strength, elongation to break, adhesion to various substrates, cure speed, etc. Such properties are known in the art. Preferably, the monomer diluent may be capable of lowering the Tg (glass transition temperature) of the cured composition including it, and of lowering the viscosity of the uncured (liquid) composition to within the range of about 1,000 to about 10,000 cps (centipoises) at 25° C., preferably about 4,000 to about 8,000 cps, as measured by a Brookfield viscometer, Model LVT, spindle speed #34, at 25° C. If a viscosity higher than about 10,000 cps results, the higher viscosity resin could be preheated to thin it.

Examples of suitable monomers include but are not limited to isobornyl acrylate; $C_6$-$C_{12}$ hydrocarbon diol diacrylates; $C_6$-$C_{12}$ hydrocarbon diol dimethacrylates; tripropylene glycol diacrylate; tripropylene glycol dimethacrylate; neopentyl glycol diacrylate; neopentyl glycol dimethacrylate; neopentyl glycol propoxylate diacrylate; neopentyl glycol propoxylate dimethacrylate; neopentyl glycol ethoxylate diacrylate; neopentyl glycol ethoxylate dimethacrylate; bisphenol A ethoxylate diacrylate; bisphenol A ethoxylate dimethacrylate; bisphenol A propoxylate diacrylate; bisphenol A propoxylate dimethacrylate; phenoxyethyl acrylate; phenoxyethyl methacrylate; phenoxyethyl ethoxylate acrylate; phenoxyethyl ethoxylate methacrylate; phenoxyethyl propoxylate acrylate; phenoxyethyl propoxylate methacrylate; polyethylene glycol nonylphenylether acrylate; polyethylene glycol nonylphenylether methacrylate; polypropylene glycol nonylphenylether acrylate; polypropylene glycol nonylphenylether methacrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; tetrahydrofurfuryl acrylate; tetrahydrofurfuryl methacrylate; isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; dicyclopentenyl propoxylate acrylate; dicyclopentenyl propoxylate methacrylate; and mixtures thereof. Most preferred compounds include isobornyl acrylate, isocyanurate acrylate and particularly tris-hydroxyethyl isocyanurate triacrylate. Other suitable reactive diluent are the HELOXY reactive diluents available from Hexion Specialty Chemicals Inc.

Also suitable are epoxidized thermoplastics, such as epoxidized polyisoprene and any thermoplastics containing double or triple carbon bonds, can be initiated by UV radiation/EB.

In general, a process for making the precured UV coated particles of the present invention with this resin would be similar to the continuous or batch processes described above in this specification for making precured UV coated epoxy particles.

4. Epoxy-Modified Novolak Resins

If desired, epoxy groups may be used to modify other groups such as phenolics to produce a UV settable epoxy modified phenolic resin.

Epoxy-modified novolacs are disclosed by U.S. Pat. No. 4,923,714 to Gibb et al. incorporated herein by reference. The phenolic portion can comprise a phenolic novolac polymer; a phenolic resole polymer; a combination of a phenolic novolac polymer and a phenolic resole polymer; a cured combination of phenolic/furan or a furan resin to form a precured resin (as disclosed by U.S. Pat. No. 4,694,905 to Armbruster incorporated herein by reference); or a curable furan/phenolic resin system curable in the presence of a strong acid to form a curable resin (as disclosed by U.S. Pat. No. 4,785,884 to Armbruster). The phenolics of the above-mentioned novolac or resole polymers may be phenol moieties or bis-phenol moieties.

In general, a process for making the precured UV coated particles of the present invention with this resin would be similar to the continuous or batch processes described above in this specification for making precured UV coated epoxy particles.

5. Resole Resins, Modified Resole Resins

An embodiment of the present invention employs a coating which includes phenol-aldehyde resole polymer provided as a solution or a dispersion. The resole resin used for the coating is liquid when applied to the substrate and thus has a molecular weight suitable to be a liquid. A typical molecular weight average for liquid resole ranges from about 400 to about 2000. The coating resole resins are supplied as a wet aqueous solution, coated onto substrate and then cured to form proppant. The resole resins may be low free phenol resole resins having less than 3 wt. %, more preferably less than 2 wt. % free phenol. However, higher free phenol ranges may be employed, such as the 2.0%-4.0% free phenol specification range of the OWR-262E resole or the 8.0% or more free phenol of Oil Well Resin 9200 resole available from Hexion Specialty Chemicals, Inc. The resoles may be conventional resoles or modified resoles.

The phenol-aldehyde resole resin has a phenol:aldehyde molar ratio from about 1:1 to about 1:3, typically from about 1:1 to about 1:1.95. A preferred mode of preparing the resole resin is to combine phenol with a source of aldehyde such as formaldehyde, acetaldehyde, propionaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.1 to 1:1.6. A typical way to make resoles is to put a phenol in a reactor, add an alkaline catalyst, such as sodium hydroxide or calcium hydroxide, and aldehyde, such as a 50 weight % solution of formaldehyde, and react the ingredients under elevated temperature until the desired viscosity or free formaldehyde is achieved. Water content is adjusted by distillation. If desired the resole coating may contain a curative, for example hexamethylenetetramine. Elasticizers or plastizers, such as bisphenol A or cashew nut oil, may also be present to enhance the binder elasticity or plasticity. Other known additives may also be present.

Modified resoles are disclosed by U.S. Pat. No. 5,218,038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol.

Modified resole resins include alkoxy modified resole resins. Of alkoxy modified resole resins, methoxy modified resole resins are preferred. However, the phenolic resole resin which is most preferred is the modified orthobenzylic ether-containing resole resin prepared by the reaction of a phenol and an aldehyde in the presence of an aliphatic hydroxy compound containing two or more hydroxy groups per molecule. In one preferred modification of the process, the reaction is also carried out in the presence of a monohydric alcohol.

Phenols and aldehydes suitable for preparing the modified orthobenzylic ether-containing phenolic resole resins are generally any of the phenols and aldehydes which may be utilized in the formation of phenolic resins. Metal ion catalysts useful in production of the modified phenolic resins include salts of the divalent ions of Mn, Zn, Cd, Mg, Co, Ni, Fe, Pb, Ca and Ba. Tetra alkoxy titanium compounds of the formula $Ti(OR)_4$ where R is an alkyl group containing from 3 to 8 carbon atoms, are also useful catalysts for this reaction. A preferred catalyst is zinc acetate.

A molar excess of aldehyde per mole of phenol is used to make the modified resole resins. Preferably the molar ratio of phenol to aldehyde is in the range of from about 1:1.1 to about 1:2.2. The phenol and aldehyde are reacted in the presence of the divalent metal ion catalyst at pH below about 7. To the reaction mixture is added an aliphatic hydroxy compound which contains two or more hydroxy groups per molecule. The hydroxy compound is added at a molar ratio of hydroxy compound to phenol of from about 0.001:1 to about 0.03:1.

Useful hydroxy compounds which contain two or more hydroxy groups per molecule are those having a hydroxyl number of from about 200 to about 1850. The hydroxyl number is determined by the standard acetic anhydride method and is expressed in terms of mg KOH/g of hydroxy compound. Suitable hydroxy compounds include ethylene glycol, propylene glycol, 1,3-propanediol, diethylene glycol, triethylene glycol, glycerol, sorbitol and polyether polyols having hydroxyl numbers greater than about 200.

After the aliphatic hydroxy compound containing two or more hydroxy groups per molecule is added to the reaction mixture, heating is continued until from about 80% to about 98% of the aldehyde has reacted. The modified phenolic resole may be "capped" to be an alkoxy modified phenolic resole resin. In capping, a hydroxy group is converted to an alkoxy group by conventional methods that would be apparent to one skilled in the art given the teachings of the present disclosure.

In general, a process for making the precured UV coated particles of the present invention with this resin would be similar to the continuous or batch processes described above in this specification for making precured UV coated epoxy particles.

6. Terpolymers of Phenol, Furfuryl Alcohol (or Furfuryl Aldehyde) and Formaldehydes A phenol-formaldehyde-furfuryl alcohol terpolymer is prepared from the catalytic reaction of phenol, formaldehyde and furfuryl alcohol, wherein the catalyst is a water soluble multivalent metal salt, and wherein the reaction is carried out under essentially hydrous conditions. The common water soluble salts of multivalent metal ions which can be used as the catalyst in the present invention are less costly than the organic solvent soluble salts at equal equivalents of metal ion that are used in the process disclosed in U.S. Pat. No. 4,255,554 to Wuskell. The use of a water soluble multivalent metal salt eliminates the necessity for controlling the reaction pH in the manner necessary with an acid catalyst. However, the multivalent metal salt catalyzed reaction must be operated at a pH of less than 7.0. When uncontaminated phenol, formalin, furfuryl alcohol and zinc or lead acetate are mixed in the proper proportions, the pH is always less than 7.0.

The water soluble multivalent metal salts used as the catalysts to make this terpolymer include the multivalent ions of manganese, zinc, cadmium, magnesium, cobalt, nickel, tin, copper, iron, lead, and calcium. Preferred catalysts are zinc acetate or lead acetate, and mixtures thereof.

The terpolymer reaction can be carried out by initially reacting furfuryl alcohol and formaldehyde at temperatures of about 85° to 105° C., at atmospheric pressure, then adding phenol and continuing the reaction to a viscosity of about 100 to 10,000, preferably about 200 to 5,000 centipoises, measured at a temperature of about 25° C. However, the reaction can be conducted at elevated temperatures of up to about 140° C. in pressurized reaction vessels, taking care to ensure that the reaction mixture does not boil under these elevated conditions. The reaction can also be carried out by initially reacting phenol and formaldehyde, then adding the furfuryl alcohol and continuing the reaction to a viscosity of about 100 to 10,000 cps, preferably about 200 to 5,000 cps, measured at about 25° C. Alternatively, the reaction can be carried out by reacting phenol, furfuryl alcohol and formaldehyde simultaneously in the presence of the water soluble multivalent metal salt catalysts. The resulting phenol-formaldehyde-furfuryl alcohol terpolymer can be used as is or diluted with any suitable solvent, including furfuryl alcohol or water.

In general, the mole ratio of phenol to furfuryl alcohol can vary from about 0.1:1 to about 10:1, respectively. The mole ratio of formaldehyde to phenol+furfuryl alcohol can vary from about 0.5:1 to 2:1, respectively in moles of $CH_2O$:phenol+furfuryl alcohol. The amount of catalyst can vary from about 0.2% to about 8% by weight of the total amount of phenol and furfuryl alcohol.

Although the reaction has been described in terms of formaldehyde, other aldehydes of the general formula: R—CHO can also be used, wherein R is a hydrocarbon radical containing about 1-8 carbon atoms such as acetaldehyde, propionaldehyde, furfuraldehyde, paraformaldehyde, the solid low molecular weight polymer of formaldehyde, and the like. The preferred form of formaldehyde is in the hydrous state, such as formalin.

Furfuryl alcohol or substituted furfuryl alcohol compounds can be used with the formula VII:

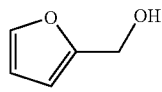

VII or substituted furfuryl alcohol compounds can be used with the formula VIII:

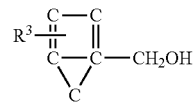

VIII where $R^3$ can be an alkyl, aryl, alkenyl, alkylol, alkoxy, aryloxy, halogen, hydrogen or hydroxy radical. The preferred compound is furfuryl alcohol.

In addition, although phenol is the preferred phenolic reactant, other substituted phenols can also be used, especially those phenols having the formula IX:

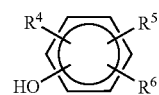

IX wherein $R^4$, $R^5$ and $R^6$ can independently be hydrogen, hydrocarbon radicals, oxyhydrocarbon radicals, hydroxy radicals or halogen, and substituted such that either the two ortho, one ortho and the para, or the two ortho and the para positions are unsubstituted. In general, the phenols that can be used are those which are suitable for making phenolic resins. Some examples are o-cresol, m-cresol, p-cresol, octyl phenol, nonyl phenol, 3,5-dimethoxy phenol, p-tert-butylphenol, p-butoxyphenol, resorcinol, 3,5-xylenol, 3-5-diethylphenol, catechol, 3,5-dibutylphenol and the like.

Terpolymers are also disclosed by U.S. Pat. No. 7,153,575, incorporated herein by reference.

In general, a process for making the precured UV coated particles of the present invention with this resin would be similar to the continuous or batch processes described above in this specification for making precured UV coated epoxy particles.

7. Furans, e.g., Furfural Alcohol-Formaldehyde

Furans employable in the present invention include resins made from urea formaldehyde and furfuryl alcohol; urea formaldehyde, phenol formaldehyde and furfuryl alcohol; phenol formaldehyde and furfuryl alcohol; or formaldehyde and furfuryl alcohol.

Suitable furan resin for use as a binder or coating for the cores of the present invention is disclosed by U.S. Pat. No. 4,694,905 to Armbruster incorporated herein by reference, or other furan resins known in the art.

Although it is possible to employ furans without the use of a catalyst, it is preferred to use a curing catalyst which is sufficiently non-volatile at the operating temperatures, to accelerate the cure of the resin. The curing catalyst can be incorporated into or premixed with the resin or added to the mixture after the resin has been added. The preferred method is to add it to the mixer after the resin has been added. The advantage of the catalyst is that, in the presence of a photoinitiator, it can permit UV curing at a lower coating temperature and/or faster processing time.

The catalyst can be used as is or dissolved in water or other suitable solvent system depending on the catalyst. A strong acid catalyst must be diluted with water to prevent localized reaction of the catalyst with the resin before the catalyst has had a chance to mix with the resin. Solid catalysts that do not melt below the mixing temperature are preferably used in aqueous solution. Catalyst may also be generated in situ.

Specific catalysts include acids with a pKa of about 4.0 or lower, such as phosphoric, sulfuric, nitric, benzenesulfonic, toluenesulfonic, xylenesulfonic, sulfamic, oxalic, salicylic acid, and the like; water soluble multivalent metal ion salts such as the nitrates or chlorides of metals including Zn, Pb, Ca, Cu, Sn, Al, Fe, Mn, Mg, Cd and Co; and ammonia or amine salts of acids with a pKa of about 4.0 or lower, wherein the salts include the nitrates, chlorides, sulfates, fluorides, and the like. The preferred class of catalyst is the ammonia salts of acids and the preferred catalyst is aqueous ammonium nitrate.

The amount of catalyst used can vary widely depending on the type of catalyst used, type of resin used, mixing temperature and type of mixer. In general, the amount of catalyst solids can range from about 0.2% to 10% based on the weight of the resin.

In general, a process for making the precured UV coated particles of the present invention with this resin would be similar to the continuous or batch processes described above in this specification for making precured UV coated epoxy particles.

8. Urethane Resins

Polyurethane resins are made by mixing a polyisocyanate component, a polyhydroxy component and a catalyst. Typically the polyhydroxy component is a polyhydroxy phenolic component dissolved in solvent. Generally the solvents are mixtures of hydrocarbon and polar organic solvents such as organic esters. Exemplary hydrocarbon solvents include aromatic hydrocarbons such as benzene, toluene, xylene, ethyl benzene, high boiling aromatic hydrocarbon mixtures, heavy naphthas and the like. Also, polyurethanes are disclosed by U.S. Pat. No. 5,733,952 to Geoffrey, incorporated herein by reference.

a. The Polyhydroxy Component

The polyhydroxy component is generally a phenolic resole resin or alkoxy modified resole resin as described above.

b. Isocyanates

The isocyanate component which can be employed in a binder according to this invention may vary widely and has a functionality of 2 or more. As defined herein, polyisocyanates include isocyanates having such functionality of 2 or more, e.g., diisocyanates, triisocyanates, etc. Exemplary of the useful isocyanates are organic polyisocyanates such as tolylene-2,4-diisocyanate, tolylene-2,6-diisocyanate, and mixtures thereof, particularly crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4"-triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following general Formula X:

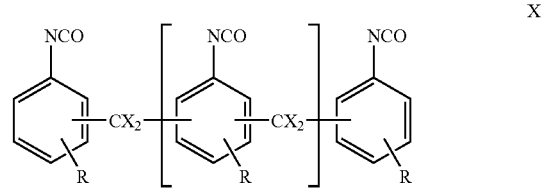

wherein R is selected from the group consisting of hydrogen, chlorine, bromine, and alkyl groups having 1 to 5 carbon atoms; X is selected from the group consisting of hydrogen, alkyl groups having 1 to 10 carbon atoms and phenyl; and n has an average value of generally about 0 to about 3. The preferred polyisocyanate may vary with the particular system in which the binder is employed.

c. Catalysts

Sufficient photoinitiator is added to the above-described isocyanate such that it is cured by exposure to radiation (EB or UV light). Optionally, if desired a suitable catalyst may also be present. The optional catalyst employed is generally a liquid catalyst. At least enough catalyst is employed to assist the photoinitiator to cause substantially complete reaction of the polyhydroxy phenolic resin component and the isocyanate component.

Exemplary catalysts include liquid tertiary amines which are basic in nature include those having a $pK_b$ value in a range of from about 4 to about 11. The $pK_b$ value is the negative logarithm of the dissociation constant of the base and is a well-known measure of the basicity of a basic material. The higher the number is, the weaker the base. Bases falling within the mentioned range are generally, organic compounds containing one or more nitrogen atoms. Preferred among such materials are heterocyclic compounds containing at least one nitrogen atom in the ring structure. Specific examples of bases which have a $pK_b$ value within the range mentioned include 4-alkyl-pyridines wherein the alkyl group has from 1 to 4 carbon atoms, isoquinoline, arylpyridines, such as phenyl pyridine, acridine, 2-methoxypyridine, pyridazines, 3-chloropyridine, and quinoline, N-methylimidazole, N-vinylimidazole, 4,4-dipyridine, phenylpropylpyridine, 1-methylbenzimidazole and 1,4-thiazine. Additional exemplary, suitable preferred catalysts include, but are not limited to, tertiary amine catalysts such as N,N-dimethylbenzylamine, triethylamine, tribenzylamine, N,N-dimethyl-1,3-propanediamine, N,N-dimethylethanolamine and triethanolamine. It is to be understood that various metal organic compounds can also be utilized alone as catalysts or in combination with the previously mentioned catalyst. Examples of useful metal organic compounds which may be employed as added catalytic materials are cobalt naphthenate, cobalt octate, dibutyltin dilaurate, stannous octate and lead naphthenate and the like. When used in combinations, such catalytic materials, that is the metal organic compounds and the amine catalysts, may be employed in all proportions with each other.

The optional liquid amine catalysts, if desired, can be dissolved in suitable solvents such as, for example, the hydrocarbon solvents mentioned hereinabove. The liquid amine catalysts are generally employed in a range of from about 0.5% to about 15% by weight, based on the weight of the phenolic resin component present in a composition in accordance with the invention.

d. Employing the Urethane-Containing Resin to Coat Substrate

In general, a process for making proppant in accordance with this invention comprises admixing substrate with the polyhydroxy component. The polyhydroxy component, e.g., resole resin, is dissolved in sufficient solvent to reduce the viscosity of the phenolic resin component to below about 1000 centipoises. This solvent comprises hydrocarbon solvents, polar organic solvents and mixtures thereof. Then, an isocyanate component, having a functionality of two or more, is added and mixing is continued to uniformly blend the substrate with the phenolic resin and isocyanate components. A sufficient amount of photoinitiator is added to permit the resin to cure when exposed to radiation (EB or UV light) forming the proppant having a single coating of precured resin.

There is no criticality in the order of mixing the constituents with the substrate. On the other hand, the photoinitiator and optional catalyst are typically added to the mixture as the last constituent of the composition. Thus, premature reaction between the components does not take place. As a practical matter, the polyhydroxy component can be stored separately and mixed with solvent just prior to use of or, if desirable, mixed with solvent and stored until ready to use. Such is also true with the isocyanate component. As a practical matter, the polyhydroxy and isocyanate components should not be brought into contact with each other until ready to use to prevent any possible premature reaction between them. The components may be mixed with the substrate either simultaneously or one after the other in suitable mixing devices, such as mullers, continuous mixers, ribbon blenders and the like, while continuously stirring the admixture to insure uniform mixing of the components.

The photoinitiator and optional liquid catalyst are generally coated onto the substrate with the phenolic and isocyanate components. The coating is then exposed to radiation so the coating is permitted to cure until reaction between the components is substantially complete. On the other hand, the photoinitiator and optional catalyst may also be admixed with the phenolic prior to coating the substrate with the isocyanate components. Urethane typically has a curing exotherm which increases its temperature during curing. This higher temperature increases curing speed.

9. Melamine/Formaldehyde Resins

Typical melamine phenolic resins for coating substrate are disclosed by U.S. Pat. Nos. 5,296,584, 5,952,440 and 5,916,966 to Walisser incorporated herein by reference.

The term melamine resin is a general term to encompass any melamine-formaldehyde resin with or without other ingredients, e.g., urea groups. Typically, mixtures of resoles and melamines are heated to effect a melamine formaldehyde reaction to produce a dissolved methylol melamine reaction product (See U.S. Pat. No. 4,960,826).

The term "A-stage" resin or dispersion means the resin or dispersion when it is made in solution prior to mixing with a substrate. The term "B-stage" resin or dispersion means the resin or dispersion mixed with substrate.

The term "melamine crystal" means melamine, per se, and underivatized in powder, crystalline, or flake form. This shall include, for example, and not by way of limitation, MCI's GP (General Purpose), non-recrystallized grade of melamine powder. Melamine crystal herein shall also mean 1,3,5-triazine-2,4,6-triamine; 2,4,6-triamino-S-triazine; and cyanurotriamide.

A typical melamine resin is provided as a dispersion comprising (i) the reaction product of combining formaldehyde and phenol at a formaldehyde to phenol mole ratio of about 0.5:1 to about 3.5:1 in the presence of a basic catalyst, and (ii) solid melamine crystal dispersed throughout the resin composition. The melamine crystal to phenol mole ratio is from about 0.01:1 to about 1:1. Moreover, the dispersion has a free formaldehyde content of at most about 0.5 weight percent.

In the present invention, melamine resins, with or without free methylol groups are set by exposure to UV light in the presence of photoinitiators or EB in the optional presence of photoinitiators. Melamine without free methylol have —OR groups rather than —OH groups. Thus, for example, unreacted, uncured, A-stage melamine dispersions can be coated onto substrate to produce a dry or high solids dispersion on the substrate.

In the alternative, melamine solutions may be applied directly to the substrate and then cured by UV or EB.

In general, a process for making the precured UV/EB coated particles of the present invention with this resin would be similar to the continuous or batch processes described above in this specification for making precured UV/EB coated epoxy particles.

10. Unsaturated Polyesters

Unsaturated polyesters, commonly referred to as "alkyds", are formed by the condensation of polyols and polycarboxylic acids with olefinic unsaturation being contributed by one of the monomers, usually the acid. Generally, difunctional alcohols (glycols) and difunctional acids are used in the condensation reaction. The reactive unsaturation incorporated into the unsaturated polyesters can be exploited to form thermosetting crosslinked polymers with monomers that contain olefinic double bonds, such as styrene and methyl methacrylate.

Common raw materials for producing unsaturated polyesters include glycols such as propylene glycol, ethylene glycol, dipropylene glycol, diethylene glycol, neopentyl glycol, tirmethylpentanediol, propoxylated bisphenol A, hydrogenated bisphenol A, 2,2,4-trimethyl-1,3-pentanediol, dibromneopentyl glycol and the like. Common diacids include terephthalic acid, adipic acid, fumaric acid, glutaric acid, chlorendic acid, isophthalic acid and the like. Alternatively, anhydrides such as phthalic anhydride, maleic anhydride, tetrabromophthalic anhydride and tetrachlorphthallic anhydride can be used as acids.

Unsaturated polyesters alkyds, with number average molecular weights usually in the range from 800 to 3000, are generally copolymerized with unsaturated monomers, such as styrene, in a curing reaction to form cured unsaturated polyester resin, which is a three-dimensionally crosslinked polymer. Alternatively, unsaturated monomers such as vinyl toluene, p-methylstyrene, dicyclopentadiene, alpha methyl styrene, methyl methacrylate, butyl acrylate, butyl methacrylate, diallyl phthalate, diallyl isophthalate, triallyl cyanurate, triallyl isocyanurate, diallyl maleate and diallyl tetrabromophthalate can be used in the copolymerization reaction.

The copolymerization reaction of unsaturated polyester alkyds and unsaturated monomers is usually initiated by free radicals generated by the decomposition of peroxides, azo compounds, or the generation of free radicals through the use of ultraviolet (UV) light or electron beams (EB). Room temperature curing systems usually employ ketone peroxides (for example, benzoyl peroxide, methyl ethyl ketone peroxide, pentanedione peroxide and cumene hydroperoxide) and transition metal (for example, cobalt, manganese, vanadium, and tin) soaps as promoters.

Examples of commercially available unsaturated polyester resins suitable for the application include AROPOL from Ashland Chemical, DION, FINE-CLAD and POLYLITE from Reichhold Chemicals, STYPOL from Cook Composites & Polymers, and AQUA SHIELD from Advance Coatings.

Polyester acrylates and methacrylates may also be suitable for coatings of the present invention. Examples of polyester acrylates include, but are not limited to EBERCRYL 846 or EBERCRYL 450 (Cytec Surface Specialties), CN203 or CN2505 (Sartomer), polyester acrylate 03-849 (Rahn).

In general, a process for making the precured UV coated particles of the present invention with these polyester resins would be similar to the continuous or batch processes described above in this specification for making precured UV coated epoxy particles.

Curing Agents

Photoinitiators

Potential agents for curing the resin in the absence of added heat are photoinitiators. Photoinitiators are employed with UV curing and optionally employed with electron beam curing.

Typically, the photoinitiator constitutes a portion of the base resin. The conceptual separation herein of the photoinitiator and base resin is primarily for purposes of explication, and it is to be understood that in practice the photoinitiator and base resin may be combined prior to the mixing and reaction of the other components of the matrix material. It should also be understood that Applicant's statement(s) herein that the photoinitiator comprises a substance is often shorthand for stating the base resin comprises a substance which affects or is affected by the photoinitiating compound and which might otherwise appear in a photoinitiator "blend."

The photoinitiator must provide reasonable cure speed without causing premature gelation of the matrix composition. Further, the blend must be thermally stable.

The photoinitiator constitutes about 0.1 to about 10 percent by weight of the coating material, preferably about 0.1 to about 5 percent, more preferably about 0.5 to about 3.5 percent. If it exceeds 10 weight percent, it could interfere with cure near the bottom of the coating film and result in poor adhesion of the coating to the substrate. In amounts less than 0.1 weight percent, however, it may not be able to adequately cure the coating.

The photoinitiator comprises one or more photoinitiating compounds. Typical photoinitiating compounds absorb UV light in the wavelength region above about 200 nm, preferably above about 250 nm.

Suitable photoinitiators may also be ionic initiators for epoxy resins and other resins of the present invention. In ionic systems, once initiated, polymerization and curing will advance even without further exposure to UV radiation. Suitable photoinitiators may also be primary cationic initiators for epoxy resins such as diarylsulfonium and triarylsulfonium salts. Cationic photoinitiators, producing either a Brönsted or Lewis acid, are used as initiators for cationically polymerizing materials (e.g. epoxies) or for resins capable of undergoing crosslinking via polycondensation reactions. Cationic photoinitiators are frequently found in classes such as the triaryl sulfonium, tetraaryl phosphonium, and diaryl iodonium salts of large protected anions (hexafluorophosphates or anitmonates). Suitable photoinitiators to cure epoxy resin include aryldiazonium salts (ArN=N+X—), and triarylsulfonium and diaryliodonium salts (Ar3S+X— and Ar2I+X—).

Examples of photoinitiators are unsaturated nitrosamines, diazonium salts such as fluoroborates, perchlorates, perfluorocarboxylates, difluorophosphates, phosphotungstates and tungstogermanates; cyclopentadienylmanganese tricarbonyl compounds; metal salts of fluorinated alkane sulfonic acids; aryliodonium salts; aromatic onium salts of the elements of groups Va and Via; and thiopyryllium salts. Among the compounds listed here, the onium salts, such as diazonium and aryliodonium salts, and onium salts of the elements of groups Va and VIa, are preferred.

Typical photo initiators include a-hydroxylketone, a-aminoketone, mono acyl phosphine, bis acyl phosphine or a phosphine oxide compound such as, for example, 2,4,6-trimethylbenzoyl diphenylphosphine-oxide. Examples of free radical-type photoinitiators (d) include, but are not limited to, the following: hydroxycyclohexylphenyl ketone; hydroxymethylphenylpropanone; dimethoxyphenylacetophenone; 2-methyl-1-[4-(methylthio)-phenyl]-2-orpholinopropanone-1; 1-(4-isopropylphenyl)-2-hydroxy-2-methylpropan-1-one; 1-(4-dodecyl-phenyl)-2-hydroxy-2-methylpropan-1-one; 4-(2-hydroxyethoxy)phenyl-2(2-hydroxy-2-propyl)-ketone; diethoxyphenyl acetophenone; 2,2-di-sec-butoxy-acetophenone; (2,6-dimethoxy benzoyl)-2,4,4 trimethylpentylphosphine oxide; 2,4,6-trimethylbenzoyldiphenylphosphine oxide; 2,4,6-trimethylbenzoylethoxyphenylphosphine oxide; 2-hydroxy-2-methyl-1-phenyl-propan-1-one; and mixtures of these.

More typical photoinitiating compounds include IRGACURE-250, 651, 819 (a bis-acyl phosphine oxide), 907, 1700 and DAROCUR-1173, 4265, all from Ciba Specialty Chemicals (Tarrytown, N.Y.), and LUCIRIN TPO and TPO-L (also known as 8893) from BASF Corporation (Charlotte, N.C.). One or more other photoinitiating compounds, such as IRGACURE-184, DAROCUR 1173 and those listed below, may also be present.

The photoinitiator also may optionally comprise one or more antioxidants or acrylated silicone additives. The preferred antioxidant is IRGANOX 1035, which is available from Ciba Specialty Chemicals (Tarrytown, N.Y.). Preferably, it is present in amount that constitutes about 1 percent of the weight of the matrix material. The preferred silicone additive is TEGORAD 2200, which is available from Tego Chemie Service (Essen, Germany). Preferably, it is present in amount that constitutes about 1 percent of the weight of the matrix material.

Photosensitizer may also be optionally present. Photosensitizers are typically chemical compounds that absorb light energy at appropriate wavelengths and then transfer absorbed energy to the photoinitiators, potentially accelerating curing speed. For example, isopropylthioxanthone (ITX) and 1-chloro-4-propoxy-thioxanthone (CPTX) are common photosensitizer for UV polymerizaiton.

Additives

Additives are used for special cases for special requirements. The resin systems of the invention may include a wide variety of additive materials.

Coupling Agents

In the practice of this invention, coupling agents may be employed to promote adhesion of the coating to substrate. It is desirable to include a silane additive to ensure good bonding between the resin and the particulate matter as a coupling agent. The use of organofunctional silanes as coupling agents to improve interfacial organic-inorganic adhesion is especially preferred.

Such coupling agents include, for example, organo silanes which are known coupling agents. The use of such materials may enhance the adhesion between the binder and the filler. Examples of useful coupling agents of this type include amino silanes, epoxy silanes, mercapto silanes, hydroxy silanes and ureido silanes. The use of organofunctional silanes as coupling agents to improve interfacial organic-inorganic adhesion is especially preferred. These organo-functional silanes are characterized by the formula XI:

$$\text{VII: } R^{13}\text{—Si—}(OR^{14})_3 \qquad \qquad \text{XI}$$

where $R^{13}$ represents a reactive organic function and $OR^{14}$ represents a readily labile alkoxy group such as $OCH_3$ or $OC_2H_5$. Particularly useful for coupling phenolic or furan resins to silica are the amino functional silanes of which Union Carbide A1100 (gamma aminopropyltriethoxysilane) is an example. The silane can be premixed with the resin or added to the mixer separately.

Other Optional Additives

The organic coating can optionally contain additives such as silicone lubricants, surfactants, wetting agents, dyes, pigments, flow modifiers (such as flow control agents and flow enhancers), hardeners, crosslinking agents, foaming agents, initiators, thermal stabilizers, light stabilizers, antioxidants, flame retardants, anti-drip agents, antiozonants, stabilizers, anti-corrosion additives, mold release agents, fillers, anti-static agents, waxes, and the like, or combination comprising at least one of the foregoing.

Typically, there is an absence of solids in the cured coating.

The surfactants may be anionic, nonionic, cationic, amphoteric or mixtures thereof. Certain surfactants also operate as flow control agents. Other optional additives include liquid toughening agents, humidity resistant additives or hot strength additives. Of course, the additives may be added in combination or singly.

Elasticizers or plasticizers, such as bisphenol A or cashew nut oil, may also be present to enhance the binder elasticity or plasticity. Other known additives may also be present.

It is optional to add a lubricant to the mixture of substrate and resin before the mixture "breaks down" into free flowing curable coated particles. The lubricant is preferably one that is liquid at the mixing temperature and has a sufficiently high boiling point so that it is not lost during the mixing process. Suitable lubricants include vegetable oil, e.g., soy or corn oil, low vapor pressure lubricating oil, liquid silicone such as Dow Corning SILICONE 200, mineral oil, paraffin wax, petrolatum, or the synthetic lubricant ACRAWAX CT (a bis-stearamide of a diamine, available from Glyco Chemicals, Inc., Greenwich, Conn.).

The organic coating can optionally contain additives such as hardeners, impact modifiers, flow control additives, crosslinking agents, foaming agents, initiators, thermal stabilizers, light stabilizers, antioxidants, flame retardants, anti-drip agents, antiozonants, stabilizers, anti-corrosion additives, mold release agents, fillers, anti-static agents, pigments, dyes, and the like, or combination comprising at least one of the foregoing.

As stated above, the organic coating can optionally contain an impact modifier. An impact modifier can impart elastic properties to the organic coating. Suitable impact modifiers include natural and synthetic elastomeric polymers, typically derived from such monomers as olefins (e.g., ethylene, propylene, 1-butene and 4-methyl-1-pentene), alkenylaromatic monomers (e.g., styrene and α-methylstyrene), conjugated dienes (e.g., butadiene, isoprene and chloroprene), and vinylic carboxylic acids and their derivatives (e.g., vinyl acetate, acrylic acid, alkylacrylic acids, ethyl acrylate, methyl methacrylate and acrylonitrile). They include homopolymers and random, block, radial block, graft and core-shell copolymers or a combination comprising at least one of the foregoing.

A typical impact modifier is a polyalcohol, also known as a polyol. The polyols, e.g. diols, are typically chain extenders to make the polymer coating resin, e.g., epoxy resin, more flexible. Polyols are compounds with multiple, for example 2, 3 or 4, hydroxyl functional groups available for organic reactions. Typical polyols are alkane diols, alkene diols, alkyne diols, alkane triols, alkene triols, alkyne triols or polymeric polyols. Typical alkane diols are C2-C16 alkane diol or C2-C6 alkane diol, for example, 1,2-ethane diol or 1,4-butane diol. Typical alkene diols are C2-C16 alkene diols or C2-C6 alkene diols, for example 1,2-ethylene glycol or 1,4-butene diol. Typical alkyne diols are C2-C16 alkyne diols or C2-C6 alkyne diol, for example a butyne diol. A typical butyne diol is 2-butyne-1,4-diol. A typical polymeric polyol, is a polyether polyol, for example, polybutanediol or polybutenediol. Typical polymeric polyols are polyether diols such as poly (1,4-butanediol), poly(ethylene glycol), polypropylene glycol) or poly(tetramethylene ether) glycol. Polymeric triols may also be suitable. A typical number average molecular weight range for polymer polyols is from 1000 to 10000.

The preferred maximum loading of the diol is 20% on the weight basis of the resin (dry basis). Typically, the loading of the diol is 2-20%, for example, 2-10%, on the weight basis of the resin. With epoxy coating the loading is preferably about 3 to 7, for example 5, weight percent based on resin.

A particularly useful class of impact modifiers comprises the AB (diblock) and ABA (triblock) copolymers and core-shell graft copolymers of alkenylaromatic and diene compounds, especially those comprising styrene and either butadiene or isoprene blocks. The conjugated diene blocks may be partially or entirely hydrogenated, whereupon they may be represented as ethylene-propylene blocks and the like and have properties similar to those of olefin block copolymers. Examples of suitable triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methylstyrene)-polybutadiene-poly(α-methylstyrene) and poly(α-methylstyrene)-polyisoprene-poly(α-methylstyrene).

Particularly preferred triblock copolymers are available commercially as CARIFLEX®, KRATON D®, and KRATON G® from Shell.

Also suitable as impact modifiers are core-shell type graft copolymers and ionomer resins, which may be wholly or partially neutralized with metal ions. In general, the core-shell type graft copolymers have a predominantly conjugated diene or crosslinked acrylate rubbery core and one or more shells polymerized thereon and derived from monoalkenylaromatic and/or acrylic monomers alone or in combination with other vinyl monomers. Other impact modifiers include the above-described types containing units having polar groups or active functional groups, as well as miscellaneous polymers such as Thiokol rubber, polysulfide rubber, polyurethane rubber, polyether rubber (e.g., polypropylene oxide), epichlorohydrin rubber, ethylene-propylene rubber, thermoplastic polyester elastomers, thermoplastic ether-ester elastomers, and the like, as well as mixtures comprising any one of the foregoing. A suitable impact modifier amongst the ionomer resins is SURLYN® available from Du Pont.

Particle Parameters

The following parameters may be useful when characterizing particles of the present invention.

1. Amount of Resin

The coating and substrate are typically fed to the mixing device to provide a weight ratio of resin (on a water free basis) to uncoated substrate of about 1 to 5 parts resin:95 parts uncoated substrate or about 2 to 4 parts resin:95 parts uncoated substrate. For example, 7.0 to 10.4 gms of liquid resole (which is 65% solids) may be used per 1000 gms of sand substrate. The amount of resin is determinable by measuring Loss-on-Ignition (LOI). Preferably sufficient resin is applied to the substrate to achieve an LOI (based on combined coating weight) of from at most about 5 weight percent, preferably about 1 to about 5 weight percent, more preferably about 2 to about 4 weight percent due to the single layer of precured resin. A precured coating of about 1% (by weight) or more is desired to have the desired improvement on crush strength. However, more than about 5% may adversely affect proppant conductivity.

LOI is typically determined in a two hour furnace test, starting by pre-conditioning a series of crucibles with lids in a furnace pre-heated to 1700° F. (927° C.). Then the crucible with the lid is placed in the furnace at 1700° F. (927° C.), the furnace is allowed to heat back up to 1700° F. (927° C.), and the crucible with the lid is maintained at 1700° F. (927° C.) for 15 minutes. The pre-conditioned crucibles and lids are placed in a desiccator containing standard desiccants and allowed to cool to room temperature. Then the conditioned crucible with the lid is weighed and approximately 8 grams of resin-coated sand are placed in the crucible. Then the crucible with the lid and the sample is reweighed. Then the covered crucible and sample are placed in the furnace at 1700° F. (927° C.), the furnace is allowed to heat back up to 1700° F. (927° C.), and the samples are kept in the furnace for 2 hours after the furnace temperature has returned to 1700° F. (927° C.). Then the crucible with lid and sample are transferred to the desiccator and allowed to cool to room temperature. Re-weigh the cooled crucible with lid containing the sample of sand, using the analytical balance. Calculate the loss-on-ignition for each sample as the difference between the original and final sample weight.

2. Particle Size

The coated particle generally has an average particle size of about 200 to about 2,000 micrometers (about 70 mesh to about 10 mesh). In one embodiment, the coated particle has an average particle size of about 300 to about 1,000 micrometers (about 50 mesh to about 18 mesh). In another embodiment, the coated particle has an average particle size of about 350 to about 650 micrometers (about 45 mesh to about 28 mesh). The coated particles can have bimodal or higher distributions. Typically the reactive and/or non-reactive powder has an average particle size of about 200 mesh (about 70 mesh) or smaller. The most common size designations are 20/40, 16/30, 30/50 and 40/70.

3. Unconfined Compressive Strength

To determine bond strength of resin-coated proppant at simulated downhole conditions under atmospheric pressure by a procedure including: preparing liquid media (2% KCl) and proppant/fluid slurry, molding/forming of RCP cores for consolidation and/or curing, consolidating and/or curing the proppant, measuring strength of consolidated cores, and calculating and reporting the results. The molded specimens made according to this procedure are suitable for measurement of Brazilian tensile strength and/or unconfined compressive strength. For compressive strength measurements, the test specimen shall be cut to a length of at least 2¼" (57.2 mm), i.e., length to diameter ration of at least 2 to 1, according to ASTM D 2938-91 Standard Test Method for Unconfined Compressive Strength of Intact Rock Core Specimens. For Brazilian tensile strength measurements, the test specimen shall be cut to a length of at least 0.56" (14.2 mm) but not more than 0.85" (21.6 mm), i.e., length to diameter ration of at least 0.5-0.75 to 1, according to ASTM D 3967-92 Standard Test Method for Splitting Tensile Strength of Intact Rock Core Specimens.

Figure 5:
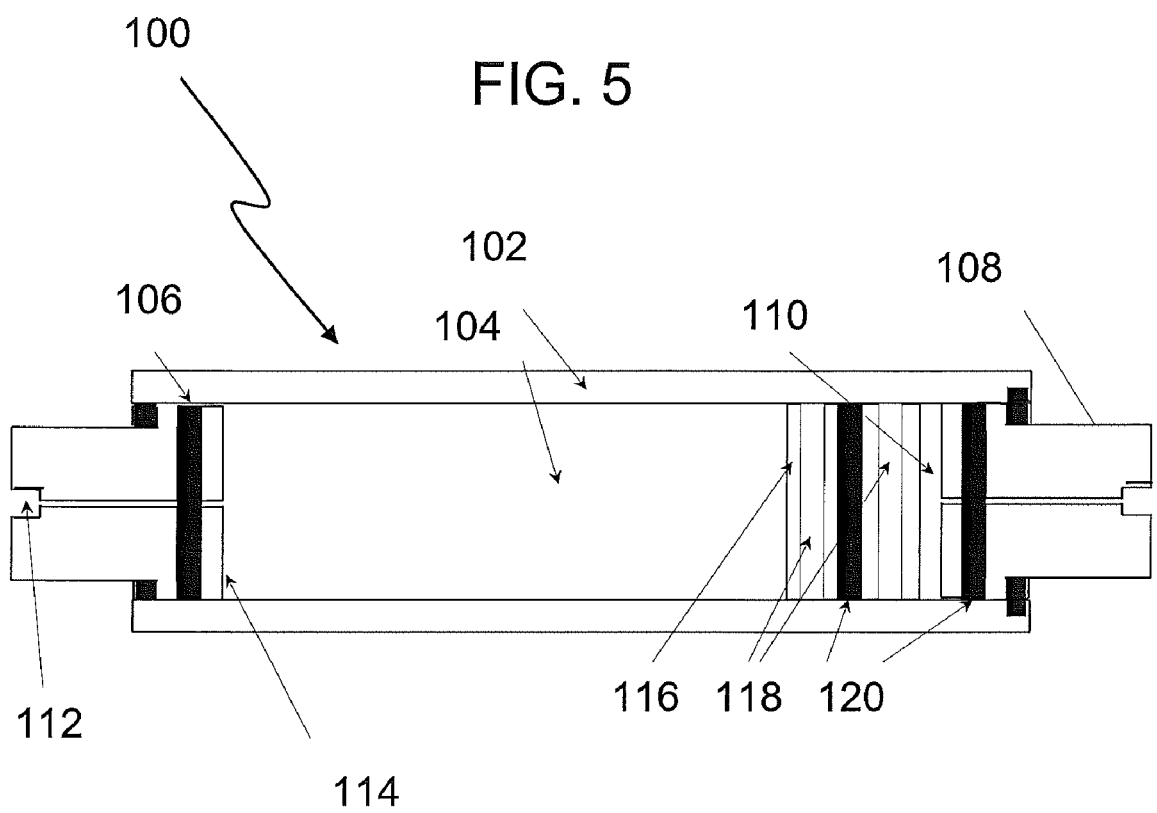
FIG. 5 shows an embodiment of a device for use in the unconfined compressive strength (UCS) test.

In particular, the following equipment and procedure are employed.

a. Equipment and Materials:

Hydraulic load frame: laboratory press capable of applying at least 1,000 psi [6.9 MPa] on the test specimens. This equipment is used to break the test specimens. Specimen mold: diameter/length ratio of 1:2.5 or greater, capable of maintaining constant load/temperature on the specimen for the duration of the shut-in time, see drawing on page 3 or equivalent. For shut-in without stress at atmospheric pressure, polypropylene test tubes may be used (in place of the specimen molds), if sized appropriately. FIG. 5 shows a diagram of a specimen mold 100. The mold 100 for preparing the test specimens (cores) is a floating piston accumulator type compressive strength apparatus which is pneumatic/hydraulic charged. The mold 100 has a cylinder wall 102, contains a proppant pack 104, O-ring seal 106, nitrogen inlet 108, pressure chamber 110, fluid port 112, sand screen filter 114, floating piston 116, wiper seal 118 and O-ring seal 120. The mold wetted parts are typically made of MONEL K-500 for use with water/oil/sand heating bath or oven, has a cross-sectional area of about 1 inch$^2$ [6.45 cm$^2$], and a pack length of about 5½ inch (14 cm).

Heat source: capable of maintaining temperature ±1° C. [2° F.] on the specimen mold. A water/oil/sand bath or a forced draft laboratory oven may be used as a thermostated heat source.

Saw: suitable for assuring that the cured core ends are parallel and for dividing long cores into 2 or more test cores.

Deionized/distilled water

Potassium chloride, ACS Reagent grade

Resin coated proppant, as appropriate

Mold release agent, silicone oil or equivalent

Miscellaneous lab ware.

b. Procedure: Sample Core Preparation:

The liquid media is prepared as appropriate. The liquid media is normally 2% KCl in deionized water. Frac fluids can be used but require special procedures.

Resin coated proppant is added to the liquid media. A typical loading of proppant is 12 lb$_m$/gallon, added. Any loading of proppant may be used. However, about 18 lb$_m$/gallon is a practical limit in the laboratory. The proppant is well dispersed in the liquid media. All entrained air bubbles should be dissipated for best results. Typically a wetting agent is employed if the bubbles will not dissipate with gentle stirring or swirling.

c. Filling the Molds:

Then at least 2, preferably 3 specimen molds are loaded with sufficient slurried proppant to give a minimum length of 2.5 times the diameter of the finished core. Loading the molds must occur before initial agglomeration of the proppant grains begins, but never longer than 30 minutes after initial slurry preparation. For a diameter of 1 inch (2.54 cm) this would be about 2.5 inch length of proppant in the mold.

Typically the mold is tapped to eliminate air bubbles and facilitate closest packing of the proppant in the mold.

Then the porosity of the proppant in the mold is filled with liquid media so the top surface is below liquid level. The proppant should be completely submerged in the liquid medium.

Then the piston is inserted and the mold closed.

d. Shut-in the Test Specimens:

Then heat is applied. A typical applied heat is about 200 degrees F. The temperature should be maintained within ±1° C. [2° F.] for the duration of the shut-in time. As test temperature is approached the fluid valve (located at the bottom of the mold) is closed. Closing the valve too soon may generate enough pressure, as the cell is heating, to create the buildup of an undesirable internal stress that could be applied to the proppant sample. Closing the valve too late may allow loss of too much fluid from the sample slurry via evaporation or boiling.

Temperature is maintained during the shut-in time.

At the end of the shut-in time the stress that may have built up during the test is released and the consolidated/cured slug from the mold is removed while the core is still hot. Undue stress is not applied to the core during the removal process.

The ends of the core should be parallel and the length to diameter ratio, L/D, should be at least 2. Tools such as a carbide-masonry blade in a power table saw or carbide-grinding wheel or a flat file may be used to achieve these dimensions. The relatively soft upper end of the core must be removed.

The prepared cores are dried typically by air-drying at ambient conditions for about 24 hours. Drying of the test cores reduces the variance between the strength measurements of the several cores prepared at the same or different times. The prepared cores are not dried in an oven, as temperatures above about 49° C. (120° F.) tend to further cure the resin coating giving misleading results.

e. Compressive Strength Measurement:

Then the length & diameter of the test cores are recorded because the average length & diameter will be subsequently used in calculations. The prepared and dried core is then placed in the load frame. The platens, parallel to within 0.005", are closed on the core without applying stress. Then stress is applied to the core at the rate of 1,000 lb-force/minute. Then the load required to break the core is recorded in units of pounds force or load, $F_g$.

f. Calculations:

Then compressive strength of each core is calculated according to the equation I.

$$\text{Compressive Strength, } F_c, \text{psi} = 4 \times F_g / \{(\pi \times d^2)[0.88 + (0.24\, d/h)]\} \quad (I)$$

wherein: $F_g$=gauge reading (lb-force); d=diameter of the core (inches); and h=length of the core (inches). In formula V, [0.88+(0.24 d/h)] is an h/d correction for test specimens having L/d ratios<2, from ASTM D2938. The correction becomes unity (zero effect) at h/d=2. The correction is not used when h/d>2.

Then the values are averaged for appropriate cores. Samples that can not be removed from the test molds in sections sufficient to meet the length to diameter ratio or that are found to have a compressive strength<10 psi, are considered to be unconsolidated (will not generate significant bond strength at downhole well conditions)

I. Use of Particles as Proppant

The particles, as described in this invention comprise precured coatings. They may be injected into the subterranean formation as the sole proppant in a 100% proppant pack (in the hydraulic fracture) or as a part replacement of existing commercial available ceramic and/or sand-based proppants, resin-coated and/or uncoated, or as blends between those, e.g., coated particles are 10 to 50 weight % of the proppant injected into the well. For example, this precured proppant (of the present invention) may be first placed in a well, and afterwards a curable proppant can be placed in the fracture that is closest to the wellbore or fracture openings. This type fracturing treatment in done without stopping to change the proppant and is know in the industry as a "tail-in treatment".

The following examples, which are meant to be exemplary, not limiting, illustrate compositions and methods of manufacturing of some of the various embodiments of the coated particles described herein.

EXAMPLES

The following examples serve to illustrate the present invention. Unless otherwise indicated all parts and percentages are by weight, and all screen mesh sizes are U.S. Standard Screen sizes. In the Examples the silane is A1100 adhesion promoter from Union Carbide Corporation.

Example 1

UV Curing

A brief overview of the batch coating cycle:

1. to the batch mixer is added 1000 grams of 20/40 mesh sand particles at room temperature;

2. the agitator is started;

3. 40 grams of liquid epoxy (EPON 828) and 2 gram of photo-initiator (CHIVACURE 1190) are added and the timer is started, (0 min.:00 sec.);

4. an UV lamp with adequate power is turned on (1 min.:00 sec.), the mixture is exposed to the UV light and the liquid resin coating is being cured under UV;

5. when the timer is at 6 minutes:00 seconds, the sand mass is free flowing upon agitation and is then removed from the mixer.

The resulting product had an LOI (Loss on Ignition) of 4 by weight of sand. LOI (Loss on Ignition) represents the amount of resin on the substrate.

This product was then tested for fines generation in a crush test according to API RP-56, "Recommended Practices for Testing Sand Used in Hydraulic Fracturing Operations", 2d edition, American Petroleum Institute, December 1995. As measured by this test the product, at conditions of 10,000 psi at room temperature, yielded about 10% fines.

Example 2

UV Curing

A brief overview of the continuous coating cycle;

1. to the continuous mixer is added 500 grams of sand per minute at room temperature;

2. the continuous mixing is started (0:00);

3. 20 grams of liquid epoxy (EPON 828), 1 gram of photo-initiator (ChivaCure 1190) are added (0:00);

4. an UV lamp mounted lengthwise on top of the mixer is turned on (0:00);

5. when the timer is at 1:00 minute, the resin coated sand is discharged from the exit of the mixer and appear tack free and free flowing.

The resulting product had an LOI of 4 wt. %. This product was then tested for fines generation in a crush test according to API RP-56, "Recommended Practices for Testing Sand Used in Hydraulic Fracturing Operations", 2d edition, American Petroleum Institute, December 1995. As measured by this test the product, at conditions of 10,000 psi at room temperature, yielded about 14% fines.

Example 3

UV Curing

A brief overview of the coating cycle;
1. To the Hobart batch mixer is added 1000 grams of 20/40 mesh sand particles at room temperature;
2. 25 g EPON 828 epoxy resin, 1.25 g CHIVACURE 1190 UV light initiator and 2.5 g 1,6-hexanediol (Sigma Aldrich) are premixed prior to addition
3. At time 0 min:00 sec the liquid mixture is added to the Hobart mixer and the agitation is started
4. At time 1 min:00 sec, the UV light is turned on
5. At time 7 min:00 sec, the coated sand mass appear free flowing/tack free and is discharged from the Hobart mixer.

The resulting product had an LOI of 2.5%. This product was then tested for fines generation in a crush test according to API RP-56, "Recommended Practices for Testing Sand Used in Hydraulic Fracturing Operations", 2d edition, American Petroleum Institute, December 1995. As measured by this test the product, at conditions of 10,000 psi at room temperature, yielded about 10% fines.

Example 4

Thermal Curing (Comparative Example)

A brief overview of the batch coating cycle for precured proppant;
1. to the batch mixer is added 1000 grams of 20/40 mesh sand particles at room temperature;
2. the agitator is started and the sand is pre-heated to 380° F.;
3. 64 grams of liquid resole (OWR 262E, available from Hexion Specialty Chemicals, Inc.) is added and the timer is started, (0 minutes:00 sec.);
4. when the timer is at 3 minutes:40 seconds, the coated sand mass is discharged from the mixer The resulting product had an LOI of 4%. This product was then tested for fines generation in a crush test according to API RP-56, "Recommended Practices for Testing Sand Used in Hydraulic Fracturing Operations", 2d edition, American Petroleum Institute, December 1995. As measured by this test the product, at conditions of 10,000 psi at room temperature, yielded about 10% fines.

Example 5

UV Curing (1,4-butanediol))

1. To the batch mixer is added 500 grams of 20/40 mesh sand particles at room temperature;
2. 10 g EPON 828 epoxy resin, 1.45 g 1,4-butanediol and 0.5 grams CPI 6992 triarylsulfonium salt cationic initiator are premixed prior to addition
3. At time 0 min:00 sec the liquid mixture is added to the mixer and the agitation is started
4. At time 1 min:00 sec, the UV light is turned on
5. At time 7 min:00 sec, the coated sand mass appear free flowing/tack free and is discharged from the Hobart mixer.

The resulting product had an LOI of 2%. This product was then tested for fines generation in a crush test according to API RP-56, "Recommended Practices for Testing Sand Used in Hydraulic Fracturing Operations", 2d edition, American Petroleum Institute, December 1995. As measured by this test the product, at conditions of 10,000 psi at room temperature, yielded about 12% fines.

TABLE 1 summarizes results from these examples.

TABLE 1

| Example Number | LOI/Resin/Process | API fine generation at conditions of 10,000 psi at room temperature |
|---|---|---|
| 1 | 4%/Epoxy/Batch | 10% |
| 2 | 4%/Epoxy/Continuous | 14% |
| 3 | 2.5%/Epoxy/Batch | 10% |
| 4 | 4%/Resole/Batch | 10% |
| 5 | 2.0%/Epoxy/Batch | 12% |

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:
1. A method comprising:
making precured free flowing coated particles having a particle size range of about 6 mesh to about 200 mesh, consisting essentially of a particulate substrate having a particle size range of about 6 mesh to about 200 mesh selected from the group consisting of sand and a sintered ceramic particle and a single layer of precured coating disposed upon the substrate, the coating consisting essentially of a continuous phase comprising curable resin in the absence of solid particles in the coating, comprising the steps of:
mixing at a temperature in the range from about 50° F. to about 150° F. the substrate with liquid coating material to form curable coated particles consisting essentially of the substrate and a single layer of continuous phase resin curable coating on the substrate, said liquid coating material comprising at least one curable resin selected from the group consisting of:
epoxy,
urethane acrylate,
epoxy (meth)acrylate,
epoxy-modified novolak resins,
resole resins,
modified resole resins,
terpolymers of phenol, furfuryl alcohol and formaldehyde,
furans,
urethanes,
melamines, and
unsaturated polyesters, and
blends or copolymers thereof;
curing the resin on the curable coated particles to form precured coated particles, wherein the curing comprises exposing the curable coated particles to ultraviolet light or electron beam;
wherein a photoinitiator is added to the resin prior to curing if the resin is to be cured with UV light and wherein a photoinitiator is optionally added to the resin prior to curing if the resin is to be cured with electron beam;
wherein the substrate is at a temperature of about 50° F. to about 150° F. when initially mixed with the resin, wherein the curing occurs before the resulting precured coated particles are placed into a subterranean formation, the resin being present in an amount of at most 5% weight percent of the coated particle, wherein the precured coated particle has a crush strength of less than 20% crush at 10,000 psi.

2. The method of claim 1, wherein the proppant having a precured coating is stored for at least 1 hour after coating before being placed into the subterranean formation, wherein the curable liquid coating material is applied to the substrate and then the mixing step occurs for a sufficient time to form the continuous phase resin curable coating on the substrate as a uniform coating on the substrate, followed by the curing of the coating.

3. The method of claim 1, wherein the curing occurs in the absence of added heat from initiation of the mixing to production of the precured coated particles, wherein the curing occurs in the absence of exposing the curable particles to microwaves.

4. The method of claim 1, wherein the coated particle has a loss on ignition of from about 1 to about 5 weight %, wherein the precured coated particle has a crush strength of less than 15% crush at 10,000 psi.

5. The method of claim 1, wherein the curable resin comprises at least one resin selected from the group consisting of epoxies, furans, free methylol-containing melamines, resole, unsaturated polyester, and blends and co-polymers thereof.

6. The method of claim 1, wherein the curable resin comprises at least one resin selected from the group consisting of bisphenol A based aromatic epoxies, cycloaliphatic epoxies and bisphenol F based epoxy.

7. The method of claim 6, wherein the coating has an absence of solid particles, wherein the coating has an absence of silicone, silane, toughening agent, rubber and latex.

8. The method of claim 1, wherein the coating has an absence of rubber or latex.

9. The method of claim 1, wherein the coating has an absence of solid particles, wherein the coating has an absence of silicone, silane, toughening agent, rubber and latex.

10. The method of claim 1, wherein the substrate has a particle size in the range from 6 to 100 mesh.

11. The method of claim 1, wherein the coating comprises at least one member of the group consisting of C2-C16 alkane diol, C2-C16 alkene diol, C2-C16 alkyne diol, and polymeric polyol.

12. The method of claim 1, wherein the coating comprises additives selected from the group consisting of hardeners, impact modifiers, flow control additives, crosslinking agents, foaming agents, initiators, photosensitizers, thermal stabilizers, light stabilizers, antioxidants, flame retardants, anti-drip agents, antiozonants, stabilizers, anti-corrosion additives, mold release agents, fillers, anti-static agents, pigments, dyes, and the like, or combination comprising at least one of the foregoing.

13. The method of claim 1, wherein the coated proppant particle has a particle size in the range of about 20/40 mesh and the coated proppant particle generates less than 12 wt % in fines, based on the total weight of the coated proppant particle when subjected to a pressure of greater than or equal to about 10,000 psi according to API RP 56.

14. The method of claim 1, further comprising treating a subterranean formation, said treating comprising injecting a fracturing fluid into the subterranean formation, wherein the fracturing fluid comprises the coated proppant particle.

15. The method of claim 1, wherein the photoinitiator is selected from the group consisting of free radical, cationic photoinitiators, and combinations thereof.

16. The method of claim 15, wherein the cationic photoinitiators are selected from the group consisting of triaryl sulfonium, tetraaryl phosphonium, diaryl iodonium salts, aryldiazonium salts, triarylsulfonium salts, diaryliodonium salts, and combinations thereof.

17. The method of claim 15, wherein the cationic photoinitiators are selected from the group consisting of unsaturated nitrosamines, diazonium salts, cyclopentadienylmanganese tricarbonyl compounds, metal salts of fluorinated alkane sulfonic acids, aryliodonium salts, aromatic onium salts of the elements of groups VA and VIA, thiopyryllium salts, and combinations thereof.

18. The method of claim 1, wherein the photoinitiator comprises one or more antioxidants or acrylated silicone additives.

19. The method of claim 1, further comprising a photosensitizer provided with the photoinitiator.

20. The method of claim 1, wherein the photoinitiator comprises from about 0.1 to about 10 percent by weight of the coating.

21. The method of claim 1, wherein the exposing the curable coated particles to ultraviolet light or electron beam comprises applying ultraviolet irradiance at 100-300 watts/inch, an energy density from about 300 mJ/cm$^2$ to about 20000 mJ/cm$^2$, at a wavelength in the spectral range of between about 200 nm to about 450 nm.

22. The method of claim 1, wherein the exposing the curable coated particles to ultraviolet light or electron beam comprises applying a dosage of electron beam radiation from about 1 Megarad to about 40 Megarad.

23. The method of claim 1, wherein the method comprises a continuous or batch process.

* * * * *